(12) United States Patent
Oh et al.

(10) Patent No.: US 6,293,002 B1
(45) Date of Patent: Sep. 25, 2001

(54) HEAT EXCHANGER ASSEMBLING APPARATUS

(75) Inventors: Chang-yun Oh; Jae-woo Kim; Kyu-bong Cho; Yong-hee Yoon, all of Taejon (KR)

(73) Assignee: Halla Climate Control Corporation, Taejon (KR)

( * ) Notice: Subject to any disclaimer, the term of this patent is extended or adjusted under 35 U.S.C. 154(b) by 0 days.

(21) Appl. No.: 09/443,151

(22) Filed: Nov. 18, 1999

(30) Foreign Application Priority Data

Nov. 18, 1998 (KR) .................................................. 98-49471

(51) Int. Cl.[7] .................................................... B23P 15/26
(52) U.S. Cl. ........................................ 29/726; 29/890.047
(58) Field of Search .......................... 29/727, 726, 33 G, 29/890.046, 890.047, 720, 890.045, 890.03, 464, 466, 467

(56) References Cited

U.S. PATENT DOCUMENTS

| | | | |
|---|---|---|---|
| 3,733,673 | * | 5/1973 | Young et al. ........................... 29/726 |
| 4,486,933 | * | 12/1984 | Iwase et al. ............................ 29/726 |
| 4,631,813 | * | 12/1986 | Daniels et al. .......................... 29/727 |
| 5,206,990 | * | 5/1993 | Wright ............................. 29/890.047 |
| 5,815,913 | * | 10/1998 | Tokura .................................. 29/727 |
| 5,870,819 | * | 2/1999 | Maybee et al. ......................... 29/726 |
| 5,966,808 | * | 10/1999 | Maybee et al. .................. 29/890.047 |
| 5,996,217 | * | 12/1999 | Tokunaga et al. ...................... 29/726 |
| 6,003,224 | * | 12/1999 | McIntosh et al. ...................... 29/726 |
| 6,067,704 | * | 5/2000 | Warren et al. .......................... 29/727 |

FOREIGN PATENT DOCUMENTS

55022425 * 2/1980 (JP) .
57205030 * 12/1982 (JP) .
60099532 * 6/1985 (JP) .

\* cited by examiner

*Primary Examiner*—I Cuda Rosenbaum
*Assistant Examiner*—T. Nguyen
(74) *Attorney, Agent, or Firm*—Leydig, Voit & Mayer, Ltd.

(57) ABSTRACT

A heat exchanger assembling apparatus includes a tube loading device for loading tubes of a heat exchanger, in an aligned state, in a tray having partitions at intervals, a fin supply device for supplying fins supplied through a chute to spaces between the partitions for the tubes in the tray, by transferring the tray at intervals, a support supply device for supplying erected supports to spaces between the partitions at the outermost side in the tray, a vision inspector for inspecting whether the fins, the tubes, and the supports are appropriately arranged in the tray without any missing part spaces, a discharging device for discharging the fins, the tubes and the supports from the tray to a table and aligning the fins, the tubes, and the supports with respect to a width direction and a lengthwise direction, a transfer device for gripping the fins, the tubes, and the supports and transferring the fins, the tubes, and the supports to a header assembly table, and a header assembling device. The header assembling device includes a pressing device for pressing and firmly holding a support on the header assembly table, a picket device for pushing the fins which are located between the tubes into the spaces between the tubes, a header assembly device for maintaining a header and for coupling the header to the tubes by deforming an end portion of the tubes after fitting the header to the tubes so as to assemble the header with the tubes on the header assembly, table, and a transfer device for transferring the header assembling device at a variable separation from the header assembly table.

21 Claims, 28 Drawing Sheets

HEAT EXCHANGER ASSEMBLING APPARATUS

BACKGROUND OF THE INVENTION

1. Field of the Invention

The present invention relates to a heat exchanger assembling apparatus, and more particularly, to an apparatus for assembling a heater core for vehicle use, which is one type of heat exchanger, in an integrated automation process.

2. Description of the Related Art

In general, a heat exchanger is assembled manually or in a semiautomatic process. The heat exchanger is assembled through steps of stacking a plurality of tubes, disposing fins for heat radiation between the tubes, arranging supports at both sides of the stacked tubes, assembling a header at both end portions of the tubes and the supports, and assembling a tank to the header. As the above steps are repeated, when a heat exchanger is produced manually or in a semiautomatic process, the number of workers is increased while productivity decreases.

SUMMARY OF THE INVENTION

To solve the above problems, it is an objective of the present invention to provide a heat exchanger assembling apparatus for an integrated automated process.

Accordingly, to achieve the above objective, there is provided a heat exchanger assembling apparatus which comprises a tube loading device for loading tubes of a heat exchanger, in an aligned state, in a tray having a plurality of partitions formed at predetermined intervals, a fin supply device for supplying fins supplied through a chute to spaces formed between the partition for the tubes in the tray, by transferring the tray at predetermined intervals, a support supply device for supplying supports in a state of being erected to spaces formed between the partitions at the outermost side in the tray, a vision inspector for inspecting whether the fins, the tubes and the supports are appropriately arranged in the tray without any missing part spaces, a discharging device for discharging the fins, the tubes and the supports from the tray to the table and aligning the fins, the tubes and the supports with respect to the width direction and the lengthwise direction thereof, a transfer device for gripping the fins, the tubes and the supports and transferring the fins, the tubes and the supports to a header assembly table, and a header assembling device. The header assembling device comprises a pressing device for pressing and firmly holding a support on the header assembly table, a picket device for pushing the fins which are located between the tubes into the spaces between the tubes, a header assembly device for maintaining a header and for coupling the header to the tubes by deforming an end portion of the tubes after fitting the header to the tubes so as to assemble the header with the tubes on the header assembly table, and a transfer device for transferring the header assembling device to be close to or separated from the header assembly table.

It is preferred in the present invention that relatively narrow partition spaces for inserting the tubes and relatively wider partition spaces for inserting the fins are formed in the tray and a rack gear is formed on a bottom surface of the tray.

Also, it is preferred in the present invention that the tube loading device comprises a first driving motor, a pair of sprockets rotated by the first driving motor and arranged to be inclined with respect to each other, a chain circulating by the sprockets, and a tube receiving portion installed with respect to the chain and having a space for accommodating the tubes.

Also, it is preferred in the present invention that the tube loading device further comprises loading guides for loading the tubes in a space formed therebetween, a knife for preventing the tubes from falling under the loading guides, a cylinder for selectively compressing or expanding the knife, a first block to which the cylinder is fixed and in which a ball screw groove is formed, a first ball screw in a vertical direction which is inserted in the ball screw groove of the first block and a first bevel gear installed at an upper end of the first ball screw, a first shaft in a horizontal direction where a second bevel gear is installed which is engaged with the first bevel gear, and a second driving motor for rotating the first shaft.

Also, it is preferred in the present invention that the tube loading device further comprises a rotation portion having a blade for pushing the loaded tube one by one, a second shaft in a horizontal direction to which the rotation portion is fixed, a third driving motor for rotating the second shaft, a first gear installed at an end portion of the second shaft, a second gear engaged with the first gear, a third shaft parallel to the second shaft and where the second gear is installed, a third bevel gear where the third shaft is installed, a second block where the rotation portion is rotatably installed at one side thereof and guides are installed at a bottom surface thereof, a fourth shaft rotatably installed penetrating the second block and where a fourth bevel gear engaged with the third bevel gear is installed at an upper end portion thereof and a third gear is installed at an lower end portion thereof, and an insertion portion guided by the guides installed at the bottom surface of the second block, and where an insertion space in which the tubes are vertically inserted is formed and a rack gear engaged with the third gear is installed at one side there.

Also, it is preferred in the present invention that the tube loading device further comprises a fourth driving motor, a second ball screw in a horizontal direction rotated by the fourth driving motor, a bearing portion to be capable of rotating with respect to the second ball screw, a nut coupled to the second ball screw, and guide shafts installed parallel to the second ball screw and to which a bush fixed to the nut is coupled, in which, by connecting the bearing portion or the nut to the first bevel gear, the third bevel gear or the rotation portion, the distance between the loading guides or the insertion portion can be selectively close to or separated from each other.

Also, it is preferred in the present invention that the fin supply device comprises first and second gears engaged with the rack gear formed on the bottom surface of the tray so that the tray can be transferred in one direction, first and second pulleys installed at rotary shafts of the first and second gears, respectively, a belt and a driving motor, installed with respect to the first and second pulleys, for rotating the first and second gears a predetermined angle, and a chute for supplying the pins, installed in the same direction as the rotary shaft of the second gear so that the fins are supplied to a space formed between the partitions of the tray when the tray arrives at a predetermined position.

Also, it is preferred in the present invention that the support supply device comprises a pickup device for gripping the supports and transferring the supports to a predetermined position, a turn shaft device for vertically erecting the supports transferred to a predetermined position by the pickup device, and a robot gripping the supports vertically erected and arranging the gripped supports at a predetermined position of the tray.

Also, it is preferred in the present invention that the pickup device comprises a finger for gripping the supports, a first cylinder for elevating the finger, and a second cylinder for guiding the finger to move in a horizontal direction.

Also, it is preferred in the present invention that the turn shaft device comprises a table on which the supports are placed, a pusher for pushing, the supports placed on the table, a turn shaft having a groove for inserting the supports; and a turn cylinder for rotating the turn shaft a predetermined angle.

Also, it is preferred in the present invention that the vision inspector comprises a roller for supporting and transferring the tray, a stopper device for stopping the tray for a predetermined time, a camera, installed above the tray supported on the roller in a standstill state, for taking a photograph of the tray, and a monitor for displaying an image photographed by the camera.

Also, it is preferred in the present invention that the tray is sent back when a missing part space is present in the tray photographed by the camera of the inspector.

Also, it is preferred in the present invention that the discharging device comprises a plate horizontally moving along guide rails installed at a frame, a first ball screw coupled to a first nut installed at the rear surface of the plate, a first driving motor for rotating the first ball screw, a cylinder mount fixed to the horizontally movable plate, a first cylinder for elevation installed at the cylinder mount, an elevating plate fixed to an end portion of a rod of the first elevation cylinder, a block guided along guides installed at the bottom surface of the elevating plate, a first pusher fixed to the block, a second nut fixed to the block, a second ball screw coupled to the second nut, and a second driving motor fixed to the elevation plate to rotate the second ball screw.

Also, it is preferred in the present invention that the pusher pushes the fins, the tubes and the supports arranged in the tray in a lengthwise direction thereof to discharge the fins, the tubes and the supports from the tray.

Also, it is preferred in the present invention that the discharging device comprises a second cylinder, a slide fixed to an end portion of a rod of the second cylinder to be guided and transferred, and a second pusher fixed to the slide and pushing the supports at the outermost side thereof, so that the fins, the tubes and the supports discharged from the tray and disposed at predetermined positions are pushed in the widthwise direction and aligned.

Also, it is preferred in the present invention that the jaw device comprises a cylinder mount installed to be capable of elevating by the third cylinder for elevation, fourth and fifth cylinders fixed to a pair of cross bars installed under the cylinder mount and the direction of being compressed or expanding thereof is opposite, a pair of plates to be capable of moving close to or separated from each other by the fourth and fifth cylinders, a pair of slides installed to be capable of sliding with respect to each of the plates, sixth and seventh cylinders of which both end portions are fixed to each of the slides so that each of the slides can move to be close to or separated from each other, and jaws fixed to each of the slides.

Also, it is preferred in the present invention that the apparatus further comprises an eighth cylinder installed above the cylinder mount and a fin pressing portion installed between the cross bars to be capable of elevating by the eighth cylinder, wherein the fin pressing portion prevents the tubes, fins and the supports from protruding when the jaws grip the tubes, the fins and the supports in an aligned state.

Also, it is preferred in the present invention that the plates and the cross bars are parallel to each other, and a guide bar extended*O in a lateral direction with respect to the plates and the cross bars is further provided so that the guide bar is connected to the plates through a bush to be capable of relatively moving and fixed to the cross bar.

Also, it is preferred in the present invention that the pressing device comprises first and second pressing blocks installed to face each other to be capable of moving at fine intervals toward the center of the header assembly table and receiving elastic bias in a direction of outside of the table, a taper plate contacting one end portion of the first pressing block to be capable of separating therefrom and a part of a contact surface is tapered, a slide capable of elevating in which the taper plate is fixed to one side thereof, a first cylinder for elevating the slide, a lever having a pusher contacting one end portion of the second pressing block and installed to be capable of rotating, a first link rotatably connected to one end portion of the lever, a second link having one end portion connected to the first link and the other end portion rotatably fixed, and a second cylinder installed to be capable of elevating a connection portion between the first link and the second link.

Also, it is preferred in the present invention that the picket device comprises a tube guide which can approach an end portion of each of the tubes arranged on the header assembly table, a plurality of pickets for pushing the fins protruding between the tubes by being inserted and protruding through the tube guide, a picket holder installed each end portion of the pickets to fix the pickets and connected to each other through a coupling groove and a coupling protrusion, to be capable of playing, a first cylinder connected to the picket holder at the outermost side among the picket holders, a picket plate extending from the lower portion of the tube guide and installed to be capable of elevating, a second cylinder installed between the lower portion of the picket plate and the lift plate for allowing the picket plate and the lift plate to approach or be separated from each other when compression and expansion, and a third cylinder for elevating the lift plate.

Also, it is preferred in the present invention that the header assembling device further comprises a plurality of tools installed at the front surface of a tool main body so that en end portion of the tube can be deformed when the end portion of the tube is inserted in a tube insertion hole of the header, first and second cylinders installed by a cylinder mount at the upper and lower sides of the tool main body, a lever rotatably installed and having a slot connected to an end portion of a rod of each of the first and second cylinders, and a gripper fixed to one side of the lever for gripping the header according to the position of the lever.

BRIEF DESCRIPTION OF THE DRAWINGS

The above objective and advantages of the present invention will become more apparent by describing in detail a preferred embodiment thereof with reference to the attached drawings in which.

DETAILED DESCRIPTION OF THE INVENTION

Figure 1:
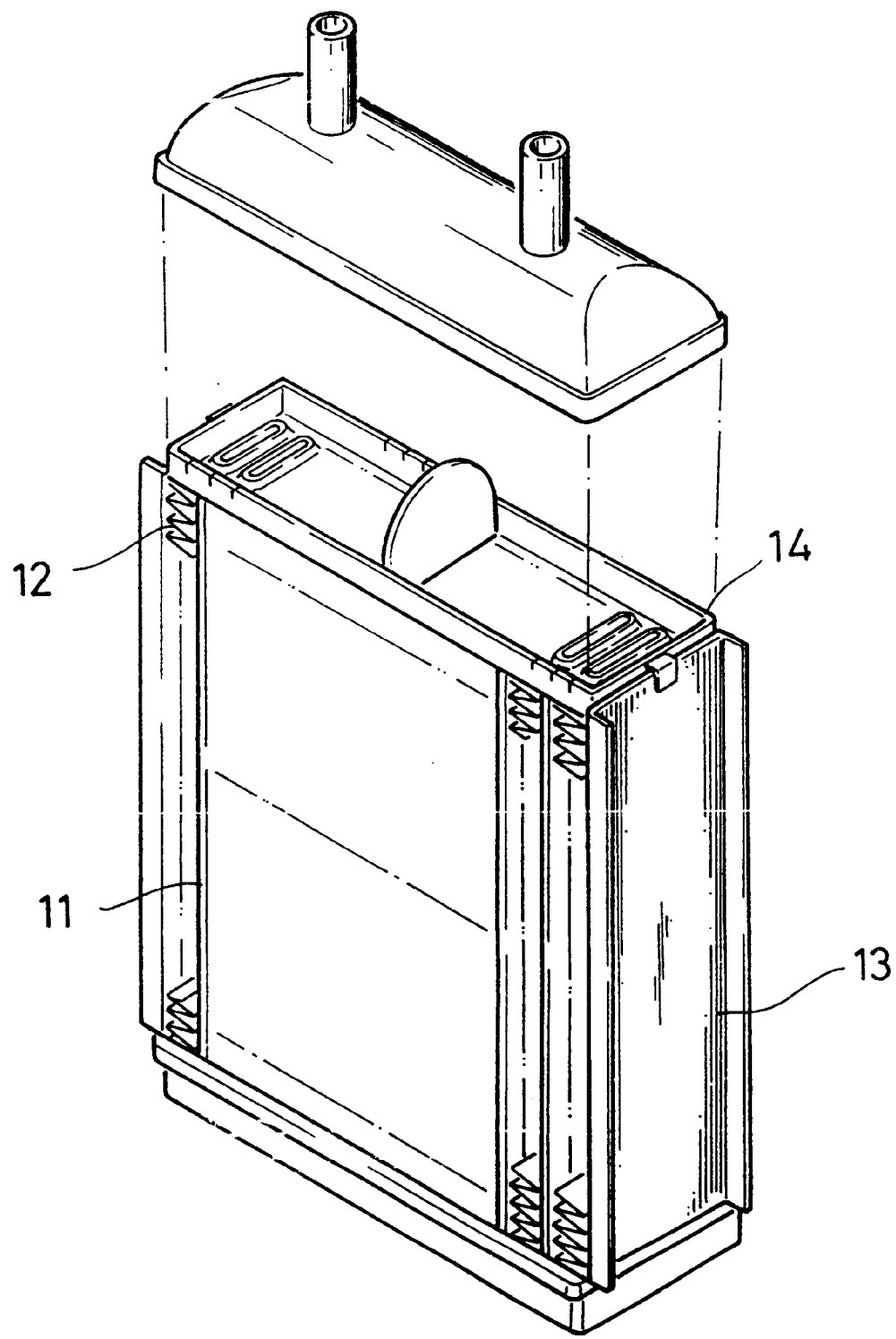
FIG. 1 is a perspective view showing a heat exchanger assembly assembled by a heat exchanger assembling apparatus according to the present invention.

Referring to FIG. 1, a heat exchanger assembly assembled by a heat exchanger assembling apparatus according to the present invention includes a plurality of tubes 11 arranged parallel to one another and a plurality of fins 12 arranged between the tubes 11. A hole into which one end portion of each of the tubes 11 is inserted is formed in a header 14. Each tube is coupled to the header 14 via the hole. Reference numeral 13 denotes supports installed at both sides of the tubes 11. Although only the header 14 installed at the top of the tubes 11 is shown in the drawing, another header is installed at the bottom of each of the tubes 11.

Figure 33:
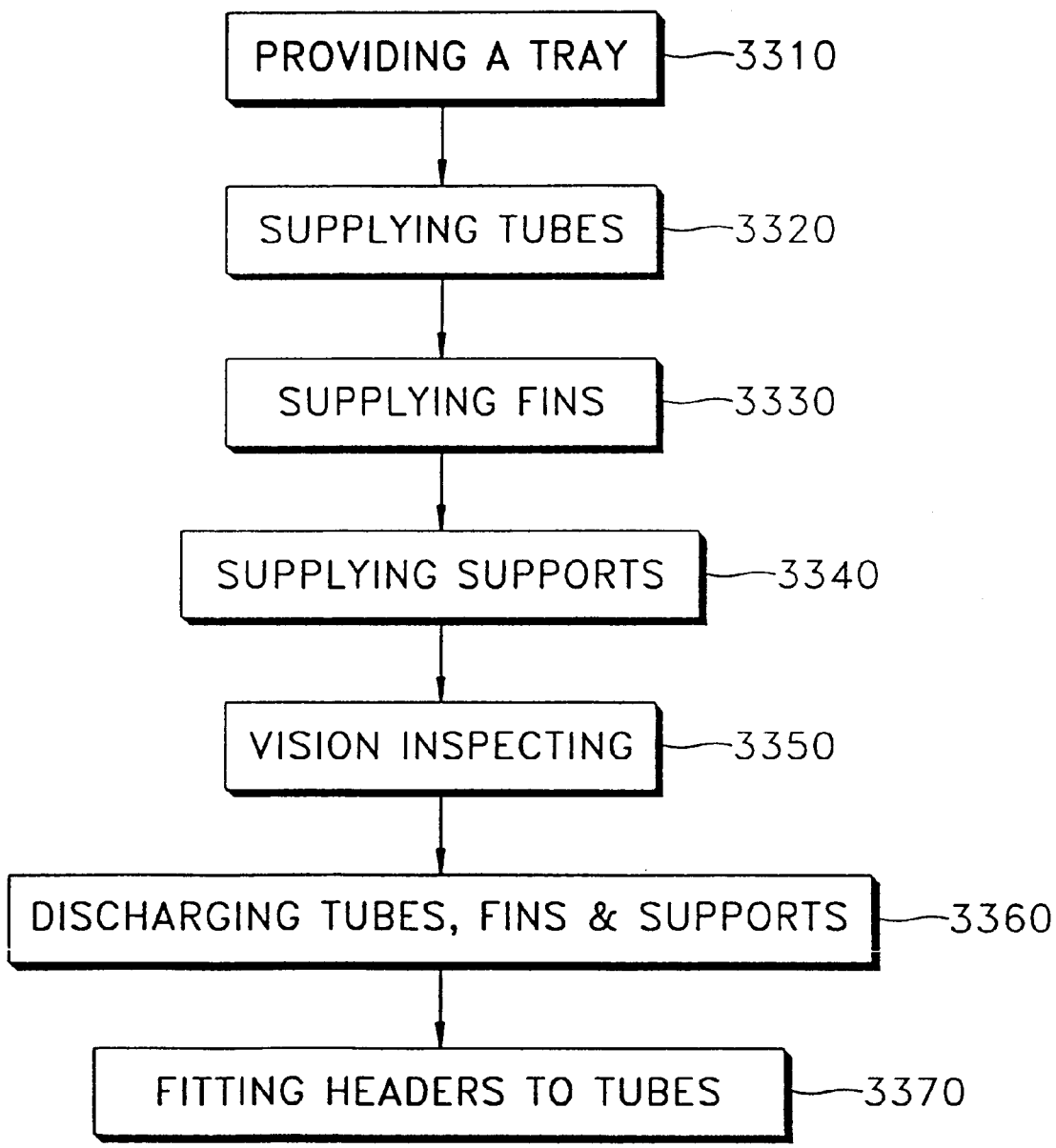
FIG. 33 is a block diagram describing the step of assembling tubes, fins, supports and headers.

The heat exchange assembly is assembled following the steps shown in the block diagram of FIG. 33. Initially, a tray for assembling the heat exchanger is provided (step 3310). The tray is formed with plurality of partitions, which partitions form spaces for tubes, spaces for fins, and spaces for supports. The tubes are supplied into the spaces for tubes by a tube loading apparatus(step 3320), the fins are supplied into the spaces for fins by a fin supply device (step 3330) and the supports are supplied into the spaces for supports by a support supply device (step 3340). Next, the vision inspector inspects whether the tubes, the fins and the supports are appropriately supplied into the spaces, respectively (step 3350). Afterwards, the tubes, the fins and the supports are discharged from the tray (step 3360) and the header is fitted to the end portion of the tubes (step 3370).

The heat exchanger assembling apparatus according to the present invention includes a tube loading apparatus for loading the tubes 11 of a heat exchanger on a tray in an aligned state, a fin supply device for supplying fins 12 in the space between the tubes 11 on the tray, a support supply device for arranging the supports 13 at the outermost portion of the tubes 11 on the tray, a vision inspector for detecting whether the fins 12, the tubes 11 and the supports 13 are appropriately arranged, a discharging device for discharging the fins 12, the tubes 11 and the supports 13 from the tray and arranging the same, and a header assembling apparatus for assembling the fins 12, the tubes 11 and the supports 13 into the header 14. Also, there are a conveyer system for conveying the assemblies of the tubes and fins in each step and a carrying device for moving the heat exchanger completely assembled for the subsequent step.

Figure 2:
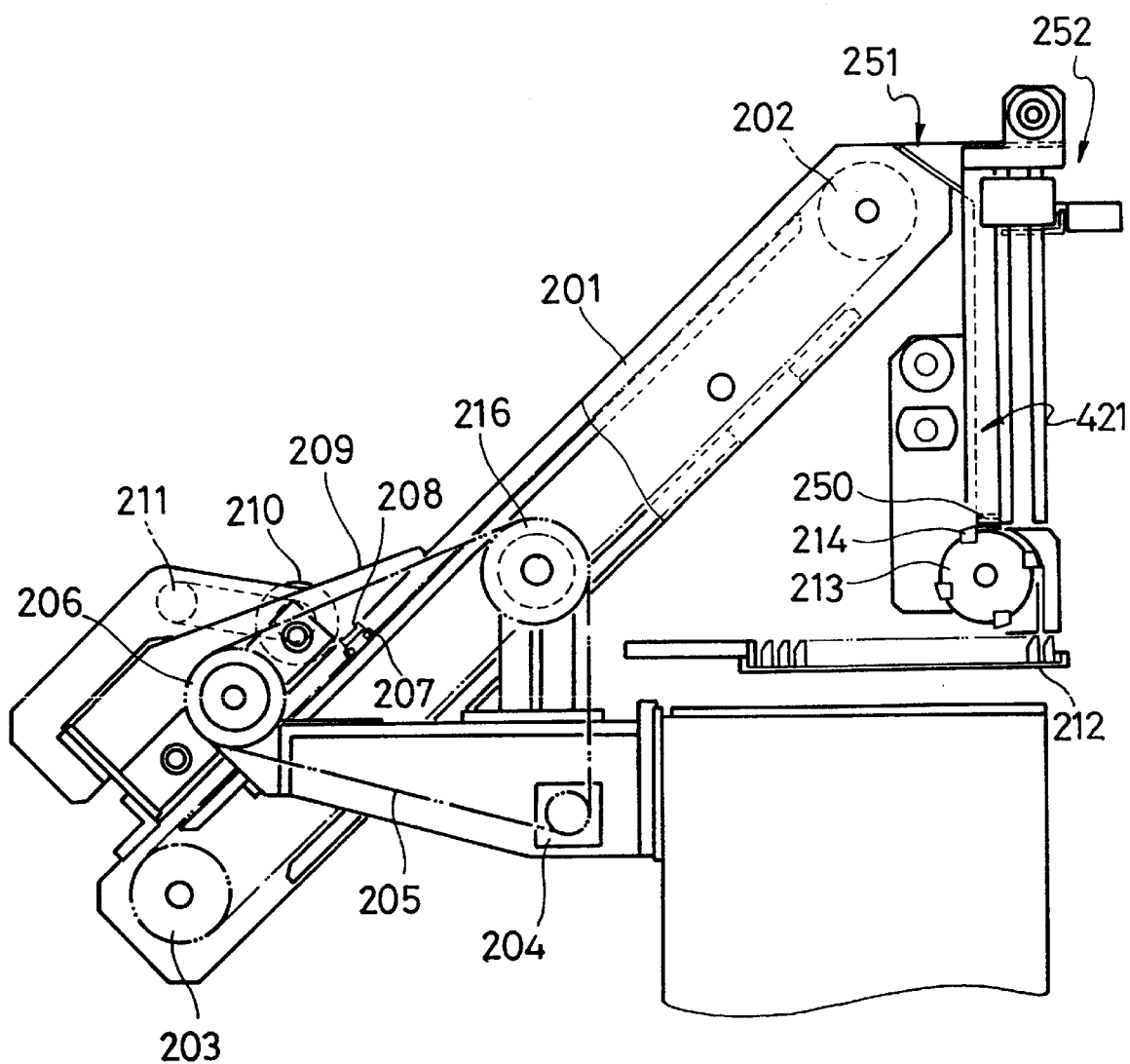
FIG. 2 is a side view showing a tube loading device.

FIG. 2 is a side view of a tube loading device. Referring to FIG. 2, upper and lower sprockets 202 and 203 are installed at upper and lower portions of a frame 201 which is installed to be inclined, and are connected via a chain 207. The chain 207 is rotated by a motor 301 (FIG. 3) coaxially installed with the upper sprocket 202. A plurality of tube receiving portions 208 are installed at the chain 207. The section of each of the tube receiving portions 208 is a concave shape (U). Tubes are loaded in the tube receiving portions 208 which are moved from the lower portion of the frame 201 to the upper portion thereof along an inclined surface. The tube receiving portions 208 installed on the chain 207 are connected to each other in a loop shape. Accordingly, as the chain 207 rotates along an endless path around the sprockets 202 and 203 and the tube receiving portions 208 are moved from the lower portion to the upper portion of the frame 201 along the inclination thereof, the tubes are supplied to a tube loading portion 252 along a supply path 251.

The tube loading portion 252 will be described later in detail. In the tube loading portion 252, a plurality of tubes are stacked up one by one. Reference numeral 250 denotes the stacked tubes. These tubes are inserted in a tube insertion portion 212 by a blade 214 installed at a rotation portion 213. The tube insertion portion 212, as shown in the drawing, has a plurality of partitions and each of the tubes 250 can be inserted between the partitions one by one. A rack gear is installed at the tube insertion portion 212 so that the tube insertion portion 212 can move forward or backward due to interaction of a pinion and a rack, as described later. When the tubes 250 are inserted, the forward movement of the tube insertion portion 212 is co-operated with the rotation of the rotation portion 213. That is, as the tube insertion portion 212 moves forward and simultaneously the blade 214 installed at the rotation portion 213 at predetermined intervals pushes the tubes 250 one by one, each tube is inserted one by one in a loading space of the tube insertion portion 212.

The tubes are loaded in space formed by a sub-frame 209 in a disarranged state. While the tube receiving portion 208 ascends in an inclined direction, the tubes loaded in the tube receiving portion 208 one by one in an orderly state ascend. That is, the tubes merely stacked by a user in the space of the sub-frame 209 are automatically ordered. Also, a brush (not shown) is installed to prevent the tubes from being overlapped during ascent. The brush can clean the surface of tubes accommodated in the tube receiving portion 208. For example, the brush can be installed on a rotator 210. The rotator 210 is rotated by receiving the power of a motor 320 (see FIG. 3) installed at one side of the sub-frame 209 via the pulleys 211 and 235 (see FIG. 3) and a belt.

Figure 3:
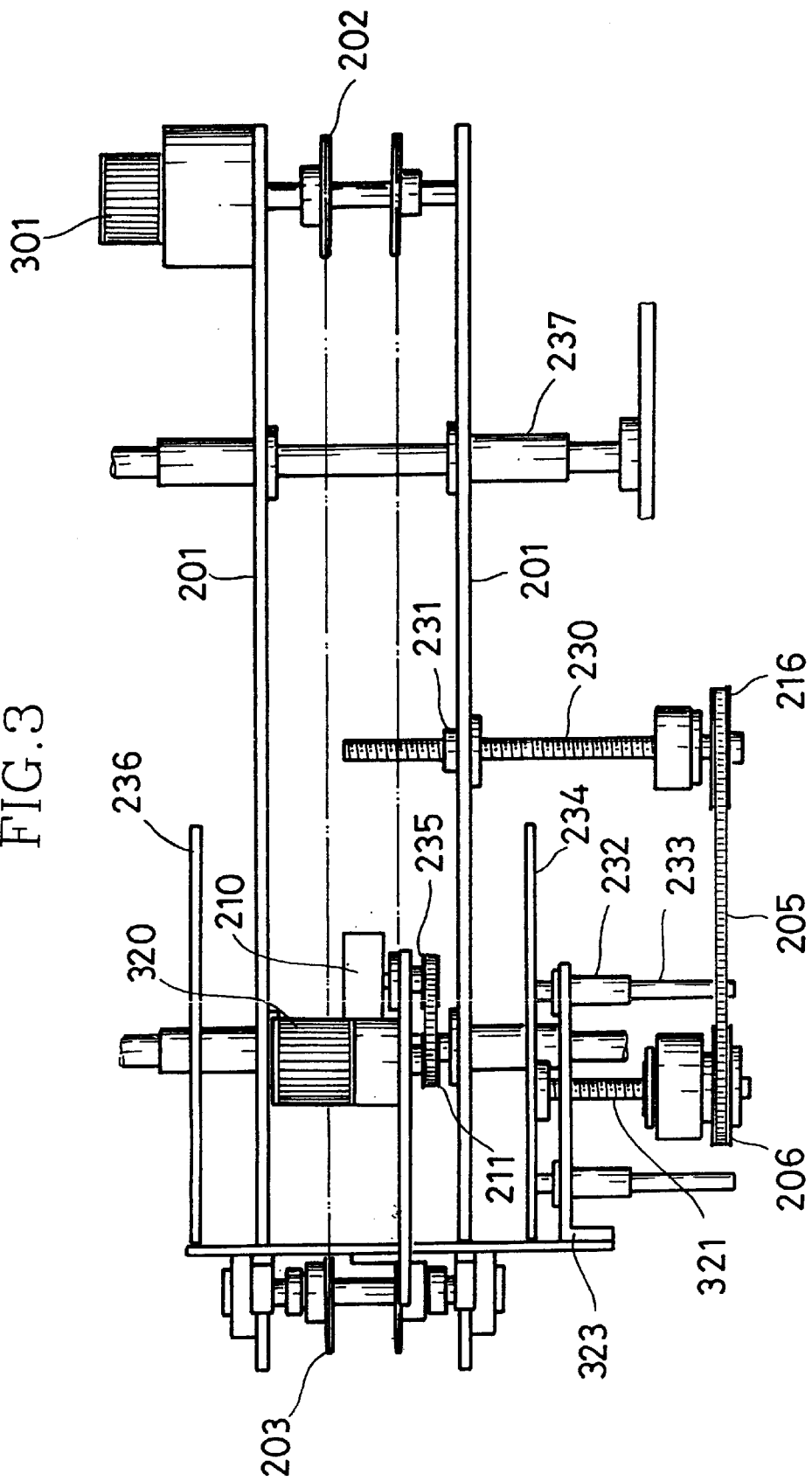
FIG. 3 is a plan view showing major parts of the tube loading device shown in FIG. 2.

FIG. 3 is a plan view of major parts of the tube loading device shown in FIG. 2. Referring to FIG. 2, another motor 204 (see FIG. 2) is installed at the lower portion of the frame 201 and the power of the motor 204 is transferred via a belt 205 and the pulleys 206 and 216. A ball screw 321 is installed at the center shaft of the pulley 206 and another ball screw 230 is installed at the center shaft of the other pulley 216. The end portion of the ball screw 321 is installed rotatably at a plate 234 via a bracket 323. A bush 232 is installed at the bracket 321 and a guide bar 233 is installed through the bush 232. The other ball screw 230 is coupled to a bush 231 fixed at the frame 201.

As the motor 204 rotates, the frame 201 and the plate 234 are moved. Due to the difference in linear movement distance (lead) per rotation between the ball screws 230 and 321, the distances from the frame 201 to the plates 234 and 236 are maintained to be constantly.

Figure 4:
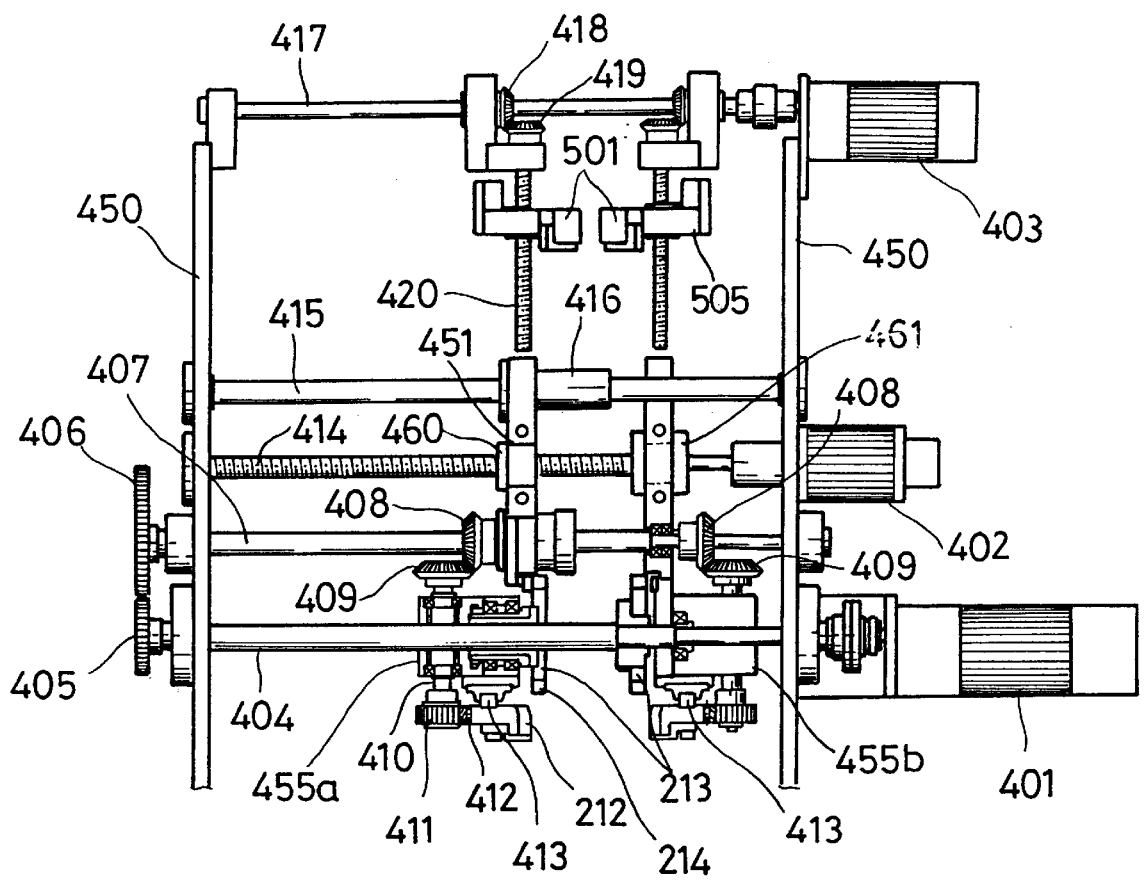
FIG. 4 is a right side view of the tube loading device shown in FIG. 2.

FIG. 4 schematically shows the structure of the tube loading device shown in FIG. 2, viewed from the right side in the drawing. Referring to the drawing, a ball screw 417, a guide shaft 415, a ball screw 414, a ball screw 407 and a rotary shaft 404 are sequentially installed extending in the horizontal direction between a pair of columns 450 installed vertically and parallel to each other. Also, two ball screws 420, which are arranged vertically and parallel to each other, are installed between two columns 450.

The rotary shaft 404 installed at the lower most portion of the tube loading device is rotated by the motor 401 installed at the side of the right column 450. The rotary shaft 404 penetrates a pair of blocks 455a and 455b and a pair of rotation portion 213 described earlier with reference to FIG. 2 are installed at the rotary shaft 404. The rotation of the rotary shaft 404 causes the rotation portion 213 to rotate. Thus, the blade 214 is rotated. As described in the above with reference to FIG. 2, the insertion of the tubes 250 by the blade 214 is possible by a rotation force generated from the motor 401.

Concurrently, the rotary shaft 404 rotates a gear 405 installed at one end of the rotary shaft 404 supported by the left side column 450 and another gear 406 engaged with the gear 405 is rotated. The gear 406 is installed (inserted around?) at a spline 407 and thus the spline 407 is rotated together with rotation of the gear 406. A pair of bevel gears 408 are installed at the spline 407 and are engaged with another pair of bevel gears 409. The bevel gears 409 are installed at the upper end of a shaft 410. The shaft 410 extends rotatably via lower blocks 455a and 455b. The shaft 410 extends in the vertical direction, not to interfere with the shaft 404 extending in the horizontal direction. A pinion 411 is installed at the lower portion of the shaft 410. The pinion 411 is engaged with a rack gear 412 installed at the side surface of the tube insertion portion 212 described with reference to FIG. 2 so that the tube insertion portion 212 can move forward or back. As the tube insertion portion 212 is installed via a linear motion guide 413 installed at the bottom surface of the blocks 455a and 455b, the tube insertion portion 212 is guided to move in a linear direction.

When the motor 401 rotates, the blade 214 of the rotation portion 213 inserts the tubes in the tube insertion portion 212 one by one. Here, as the space formed in the tube insertion portion 212 is of a structure having a plurality of partitions, as shown in FIG. 2, the tubes can be inserted between the partitions one by one only when the forward movement of the tube insertion portion 212 and the rotation of the rotation portion 213 are co-operated with each other. The rotation of the shaft 404 is transferred to the spline 407 via the gears 405 and 406, so that the tube insertion portion 212 can advance, and is transferred to the vertical shaft 410 via the bevel gears 408 and 409. Next, as the pinion 411 installed at the end portion of the shaft 410 is engaged with the rack 412 so that the tube insertion portion 212 can advance.

A motor 402 installed at the side surface of the right side column 450 rotates the ball screw 414. A nut 460 is coupled to the ball screw 414 and a bearing portion 461 is installed at the ball screw 414. Thus, as the ball screw 414 rotates, the nut 460 can move to the left or right. The nut 460 is coupled to a bush 416 via a block 451. The bush 416 is guided along the shaft 415. Also, the nut 460 is connected to the block 455a thereunder. Thus, as the ball screw 414 is rotated by the rotation of the motor 402 and accordingly the nut 460 is moved in the left or right direction, the nut 460 is guided by the bush 416 and the guide shaft 415. Also, the block 455a coupled to the nut 465 can move to the right or left.

The movement of the block 455a can make the distance between the tube insertion portions 212 parallel to each other wider or narrower. When the distance of the tube insertion portions 212 is narrower than the length of the tube itself, the tubes can be stacked in order. To the contrary, when the distance of the tube insertion portions 212 is wider than the length of the tube itself, the tubes falls, not being inserted between the tube insertion portions 212. The tubes arranged in order in the tube insertion portion 212 can be stacked on a tray for assembly (see FIG. 5), which will be described later.

Another motor 403 is installed at the upper portion of the right column 450, which rotates the shaft 417 extending in the horizontal direction between the columns 450. A bevel gear 418 is installed on the shaft 417 and engaged with a bevel gear 419 installed at the upper portion of each of the vertically extended ball screws 420. A portion where a cylinder 501 is installed can move up and down by the operation of the vertically arranged ball screws 420. That is, a nut is formed in a block 505 where the cylinder 501 is installed and the block 505 can move up and down by the interaction between the ball screws 420 and the nut of the block 505. A knife which will be described later is installed at an end portion of a rod of the cylinder 501 and the tube above the knife is prevented from falling when the knife protrudes. When the motor 403 rotates, the bevel gears 418 and 419 are rotated and the ball screws 420 are rotated. Accordingly, the block 505 where the cylinder 501 is installed and the knife (not shown) installed therein can move up and down.

Figure 5:
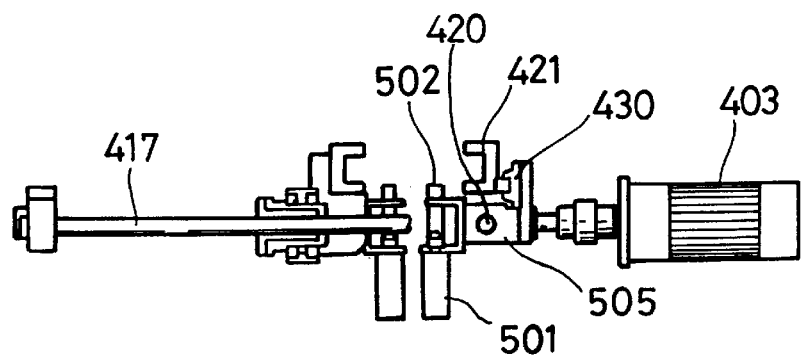
FIG. 5 is a plan view of the tube loading device of FIG. 4.

FIG. 5 shows a part of the tube loading device shown in FIG. 4, viewed from the top thereof. Referring to the drawing, a loading guide 421 is formed in a ⊂ shape and is extended from the supply path 251 of FIG. 2 to the upper portion of the blade 214 of FIG. 4. The tubes fall along the space formed by the loading guide 421 and are stacked in the space.

The cylinder 501 is fixed to one side of the block 505 and a screw groove to which the ball screw 420 is coupled is formed in the block 505. The block 505 and the cylinder fixed thereto are guided by the linear motion guide 430 while being moved up and down by the ball screws 420. Also, a knife 502 installed at the end portion of the air cylinder 501 can protrude or retreat by the air cylinder 501. The knife 502 protrudes toward or retreats from the space formed by the loading guide 421. The bottom of the space in the loading guide 421 can be open or closed by the operation of the knife 502. That is, in the state in which the knife 502 protrudes, the tubes falling are stacked on the knife 502 not arriving the upper portion of the rotation portion 213 (see FIG. 2). When the knife 502 retreats, the tubes stacked thereon can fall onto the rotation portion 213. The knife 502 can adjust the amount of the tubes stacked on the rotation portion 213 while moving up and down with the cylinder 501.

Figure 6:
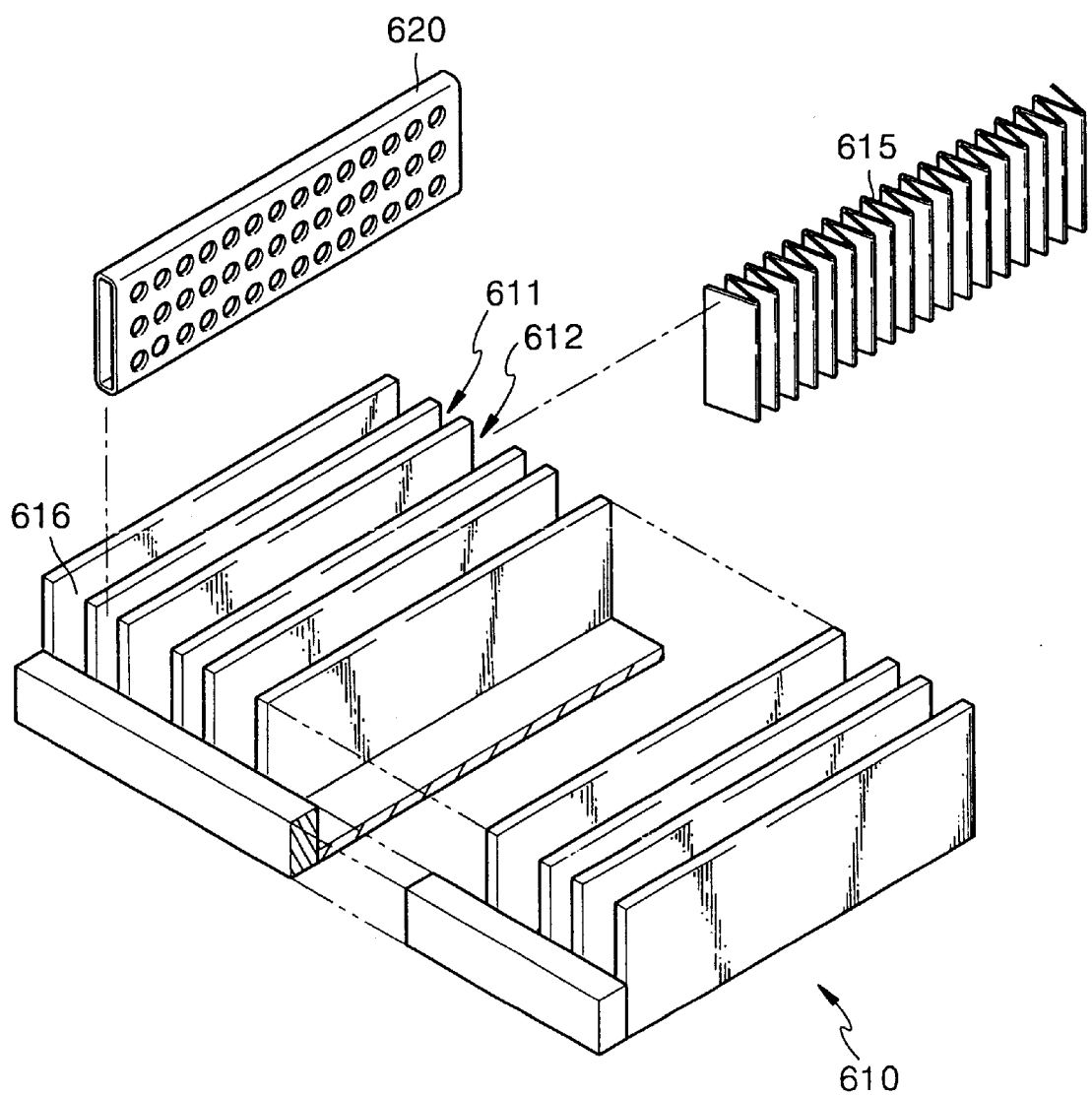
FIG. 6 is a perspective view showing a state in which fins and tubes are arranged on a tray.

FIG. 6 shows a schematic view of a tray for assembly. Referring to the drawing, a tray 610 is of a structure having a plurality of parallel partitions with a relatively narrow spaces 611 and a relatively wide spaces 612. A tube 520 is inserted in the narrow interval spaces 611 and a fin 615 is inserted in the wide interval spaces 612. At the outermost sides of the tray 610, a middle-width interval spaces 616 is formed for inserting the supports. Although not shown in the drawing, a rack gear is formed at the bottom surface of the tray 610. The rack gear is engaged with a gear which will be described in the subsequent fin insertion process so that the tray is accurately moved at a predetermined interval.

In FIG. 2, the tubes arranged in the tube insertion portion 212 parallel to one another fall as the distance between the tube insertion portions 212 becomes wider. The operation of the distance between the tube insertion portions 212 being wider to enable the tubes fall is described above with reference to FIG. 4. Here, the tray 610 is present under the tube insertion portion 212. That is, the tray 610 is transferred to a conveyer device (not shown) and then moved up by an elevating device (not shown) and disposed directly under the tube insertion portion 212. The tubes falling are inserted in the narrow interval 611 formed in the tray 610.

The tubes inserted in the tray 610 are transferred to the subsequent process through a conveyer (not shown). In the subsequent process, the fin 615 is inserted in the wide interval 612 of the tray 610.

Figure 7:
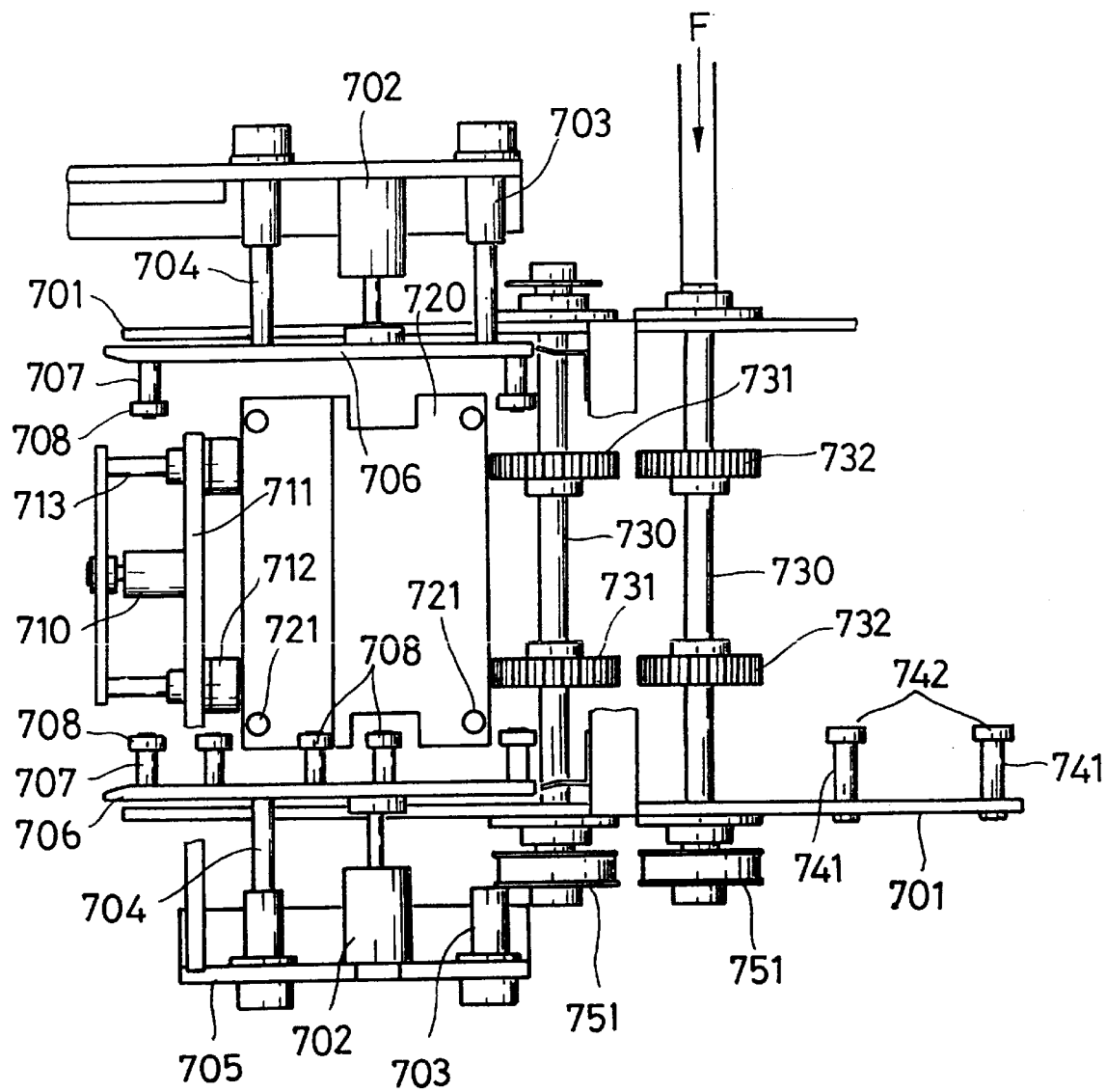
FIG. 7 is a plan view of a fin supply device.

FIG. 7 is a plan view of a fin supply portion. Referring to the drawing, a cylinder 702 is installed at each of frames 701 arranged to be parallel to each other. A bar 706 is move forward or back by the operation of the cylinder 702. A bush 703 and a guide shaft 704 installed at a bracket (not shown) are provided for guiding the forward and backward movement of the bar 706. A plurality of shafts 707 are installed at an end portion of the bar 706 and rollers 708 are rotatably installed at end portions of the shafts 707. Thus, as the cylinder 702 advances or retreats, the rollers 708 advance or retreat so that the rollers facing each other can move close to, or be separated from each other. When the rollers 708 are closely disposed, the tray 610 can be supported at the upper portions of the rollers 708 to be capable of moving.

A elevating lift 720 is installed between the frames 701. Four vertical bars 721 are installed at the upper portion of the elevating lift 720 and the tray 610 (see FIG. 6) can be supported at the end portions of the vertical bars 721. The elevating lift 720 can be moved up and down by the operation of a cylinder which will be described later.

Reference numerals 710, 711, 712 and 713 denote parts for inserting the tubes into the tray.

Gears 731 and 732 are installed at the downstream side of the rollers 708. The gears 731 and 732 are rotatably installed at shafts 730 and arranged between the frames 701. Pulleys 751 are installed at end portions of the shafts 751 and connected to a servo motor (not shown) by a belt. Thus, a rotation force of the servo motor can rotate the gears 731 and 732 via the pulleys 751 and the belt.

The gears 731 and 732 can be engaged with a rack gear formed on the bottom surface of the tray 610. The tray 610 supported by the rollers 708 can move by the gears 731 and 732. Here, the height of the tray 610 supported by the rollers 708 is higher than that of the tray 610 supported by the gears 731 and 732. Thus, the difference in height is overcome by the operation of the elevating lift 720.

In the operation of the fin supply portion having the above structure, when the tray 610 is supported by the rollers 708, the elevating lift 720 ascends so that the vertical bars 721 contact the bottom surface of the tray 610. Next, the rollers 708 move to be separated from each other by the operation of the cylinder 720 and the elevating lift 720 descends. Here, as one end of the rack formed on the bottom surface of the tray 610 is engaged with the gear 731, the tray 610 can move.

In FIG. 7, a reference numeral indicated by arrow F denotes a position where the fin is inserted. The tray 610 can be intermittently transferred to the right at accurate intervals by the operations of the servo motor, the pulley 751 and the gears 731 and 732, as described above. During transfer of the tray 610, whenever the narrow interval 611 (see FIG. 6) formed in the tray 610 meets the position indicated by arrow F, a fin is supplied through a chute (not shown). The fin is inserted in the narrow interval (611) of the tray 610. For continuous transfer of the tray 610, other rollers 742 are rotatably installed at a shaft 741.

Figure 8:
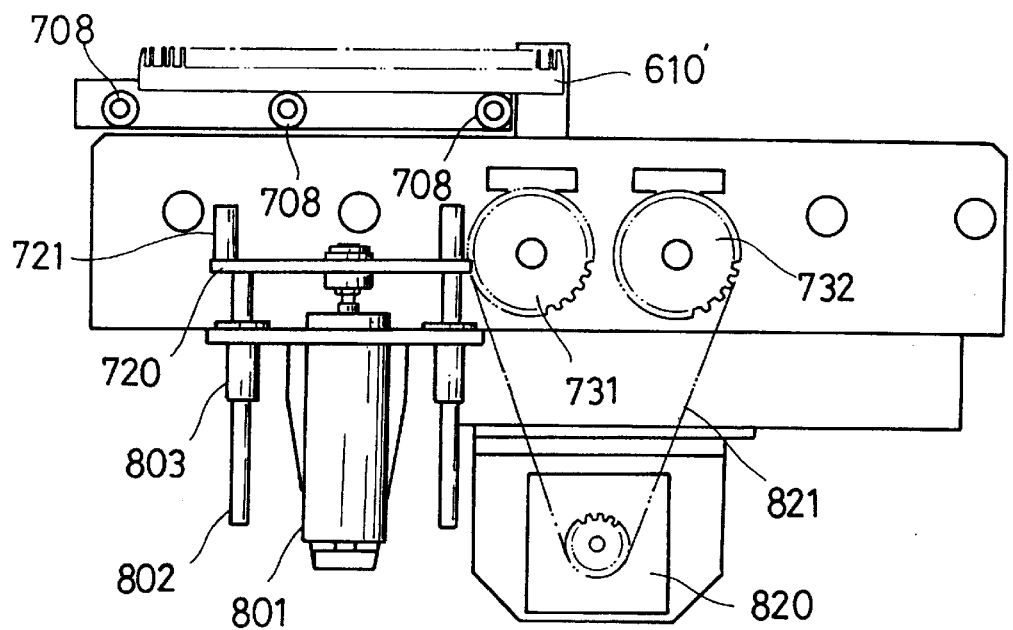
FIG. 8 is a front side view of the fin supply device.

FIG. 8 is a front side view of the fin supply portion. Referring to the drawing, the vertical bars 721 are installed on the upper surface of the elevating lift 720 and a tray 610' is supported by the rollers 708. As the elevating lift 720 ascends, the tray 610' is supported by the vertical bars 721. The elevating lift 720 can be moved up and down by the cylinder 801. Bushes 803 and guide shafts 802 are provided to guide the up and down movement of the elevating lift 720.

The gears 731 and 732 are connected to the servo motor 820 by a belt 821. The servo motor 820 intermittently rotates a predetermined angle so that the tray placed on the gears 731 and 732 can move at predetermined intervals. Thus, the fin can be accurately supplied.

Figure 9:
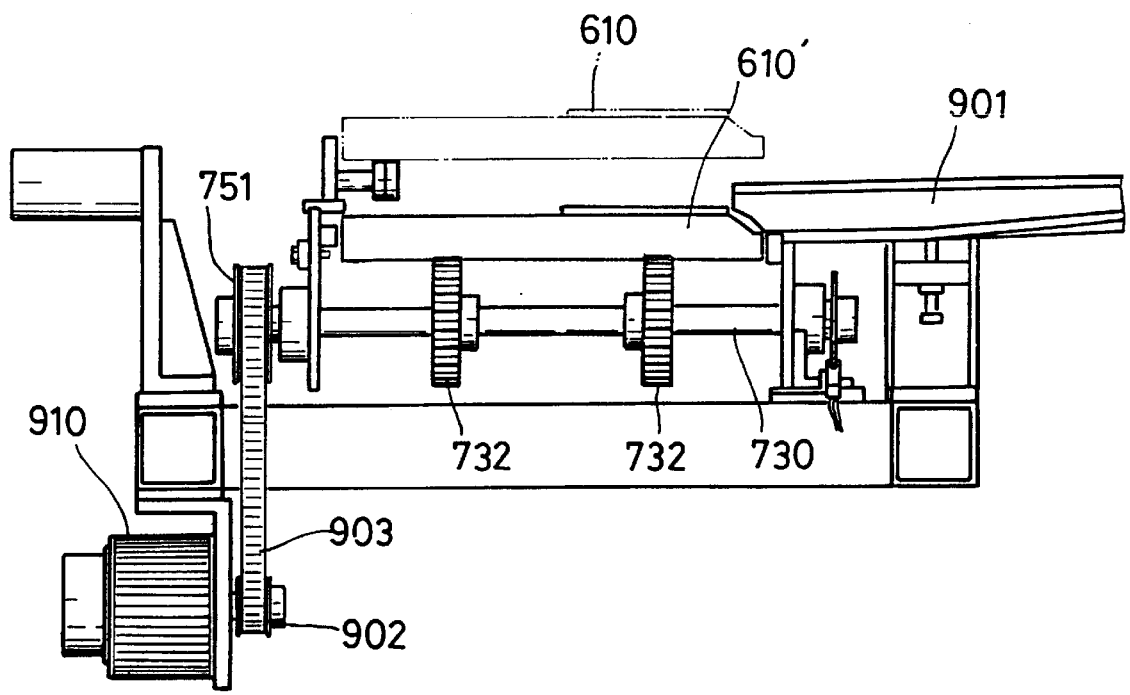
FIG. 9 is a right side view of the fin supply device of FIG. 7.

FIG. 9 is a right side view of the fin supply portion of FIG. 7. As shown in the drawing, the trays 610' supported by the rollers 708 and the tray 610 supported by the gears 731 and 732 are located on the different planes. A chute 901 is extended in the same direction as the shaft 730 which supports the gear 731 to be capable of rotating. A fin supplied by a fin supply device (not shown) is supplied through the chute 901. Whenever the wide interval 612 (see FIG. 6) matches the end portion of the chute 901, the fin is supplied to and placed in the tray 610'. When the supply of pins is completed, the support 13 is supplied to the out side of the outermost fin.

Figure 10:
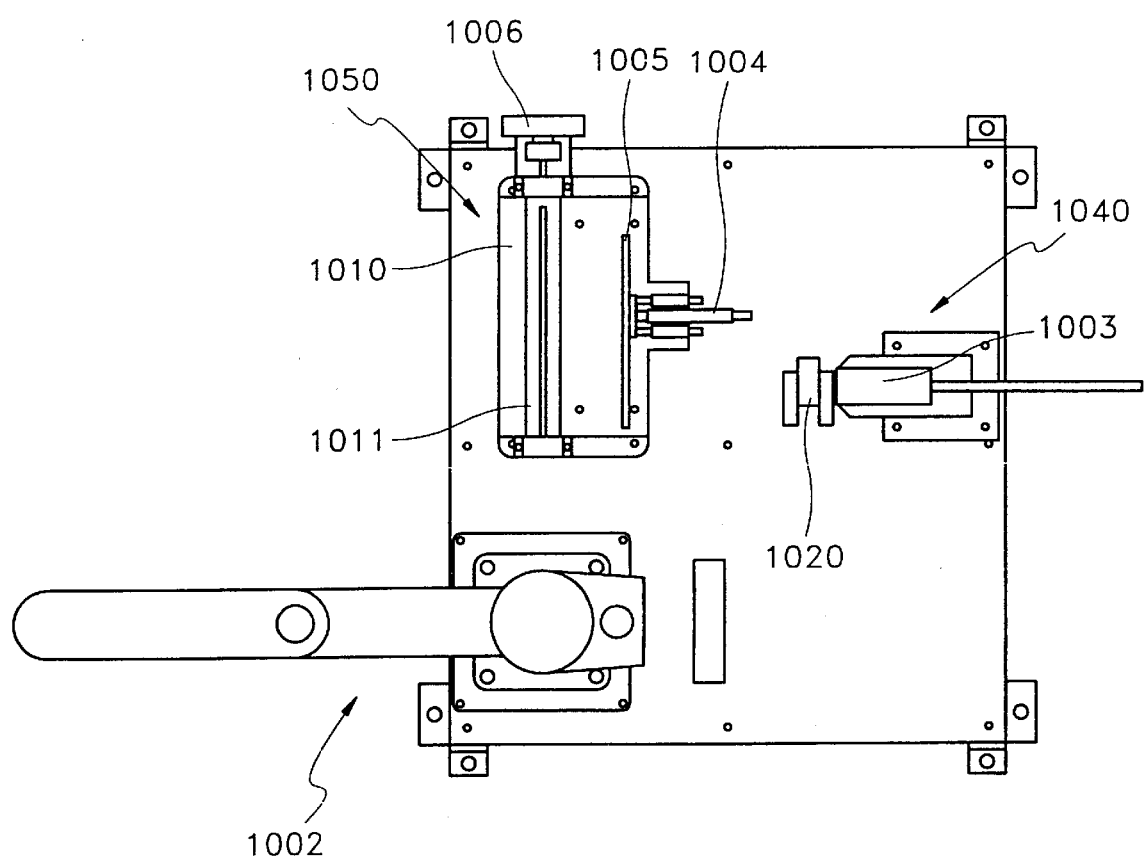
FIG. 10 is a plan view of a support supply device.
Figure 11:
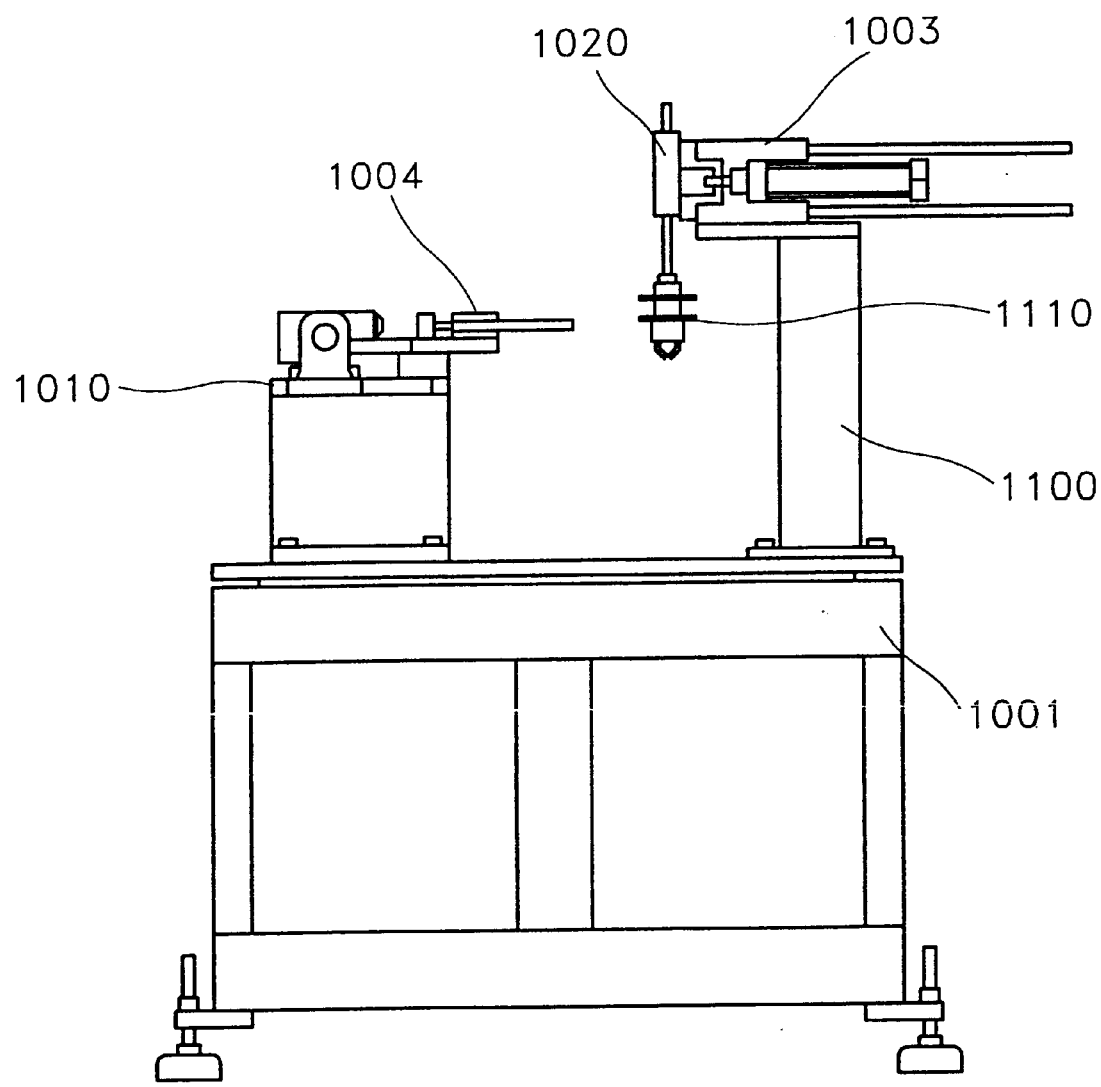
FIG. 11 is a front side view of the support supply device in a state in which a robot is omitted.

FIGS. 10 and 11 are a plan view of a support supply device and a front side view of the support supply device in a state in which a robot is omitted. Referring to the drawings, a support (not shown) is gripped up by a robot 1002 and supplied to the tray 610 (see FIG. 6). The robot 1002 is fixed to a table 1001 and a pickup device 1040 and a turn shaft device 1050 are fixed to the table 1001 to assist the supply of support by the robot 1002. The support supply device includes a pickup device 1040 for gripping up the support, and a turn shaft device 1050 for changing the posture of the support to enable the robot to supply the support to the tray 610, on the table 1001.

The pickup device 1040 includes an elevating cylinder 1020 for moving a finger 1110 up and down and a guide cylinder 1003 for moving the finger 1110 forward and backward, which are supported on the table 1001 by being supported by a column 1100. Also, although not shown in the drawings, a cylinder for performing the function of gripping or releasing the support is provided. The finger 1110 of the pick-up device 1040 picks up the support continuously supplied and places the gripped support on a sub-table 1010 of the turn shaft device 1050. That is, when the finger 1110 grips the support, the finger ascends by the operation of the elevating cylinder 1020 and advances by the operation of the guide cylinder 1003. Accordingly, the support arrives at the upper portion of the sub-table 1010 and the finger 1110 descends and releases the support to place it on the sub-table 1010.

The turn shaft device 1050 performs a function of erecting the support vertically. That is, when the support is to be supplied to an space formed at the outermost side of the tray 610, the support needs to be gripped up and inserted into the tray 610vertically by the finger 1110 of the robot 1002. The turn shaft device 1050 includes a pusher 1005 moving forward or backward by a guide cylinder 1004, a turn shaft 1011 where a groove is formed for inserting the support pushed by the pusher 1005, and a turn cylinder 1006 for rotating the turn shaft 1011.

Figure 12:
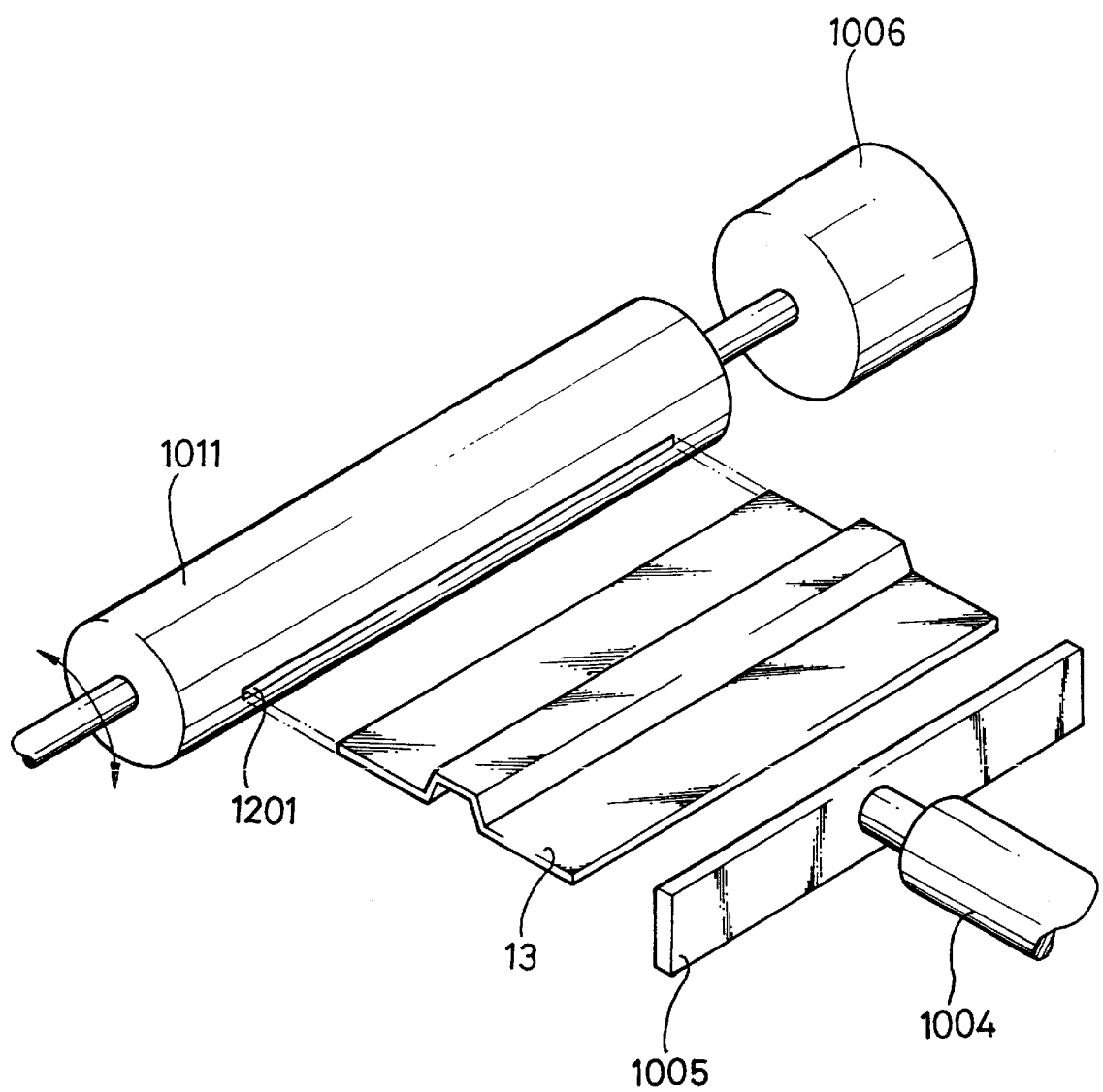
FIG. 12 is a perspective view of a turn shaft device.

FIG. 12 shows the turn shaft device in detail. Referring to the drawing, the turn cylinder 1006 rotates the turn cylinder 1011 so that an insertion groove 1201 is disposed horizontally. Next, the pusher 1005 pushes a support 13 to be inserted in the insertion groove 1201. Here, not the entire portion but a portion of the overall width of the support 13 is inserted. Next, as the turn shaft 1011 is rotated by the operation of the cylinder 1006, the support 13 is in a state of being erected vertically. Thus, a finger of the robot 1002 (see FIG. 10) can take a grip on a portion of the support 13 protruding from the insertion groove 1201.

Figure 13:
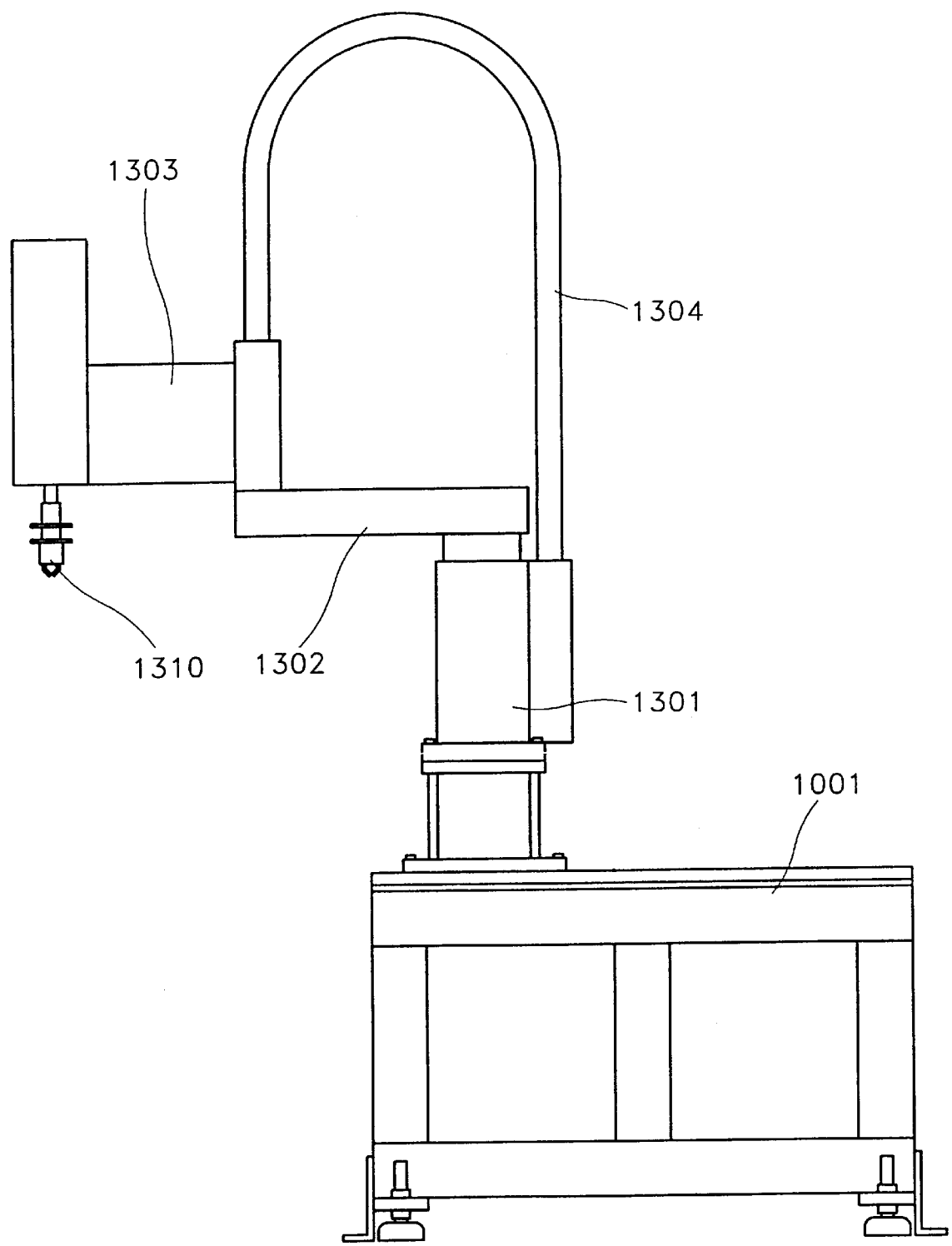
FIG. 13 is a front side view showing a robot installed on a table.

FIG. 13 shows a front-view of the robot 1002 shown in FIG. 10. Referring to the drawing, the robot 1002 includes a column 1301 fixed to the table 1001, a first arm 1302 having one end thereof to be capable of rotating with respect to the column 1301, and a second arm 1303 rotatably installed to be capable of rotating with respect to the other end of the first arm 1302. Motors (not shown) are installed above the first and second arms 1302 and 1303 to generate relative movements by the first and second arms 1302 and 1303. The finger 1310 is installed at an end portion of the second arm 1303 and the finger 1310 can move up and down by the operation of an actuator (not shown) and grip or release the support. Reference numeral 1304 denotes a cable.

When the supply of tubes, the fins and the supports to the tray 610 is completed, it is checked whether there are any missing parts in the tubes, the fins and the supports. The above is made possible by checking all narrow and wide intervals of the tray 610 are filled with parts. In the present invention, the above check of missing parts is performed by a vision inspector. If an interval where a part is missing is found, the tray 610 is sent back.

Figure 14:
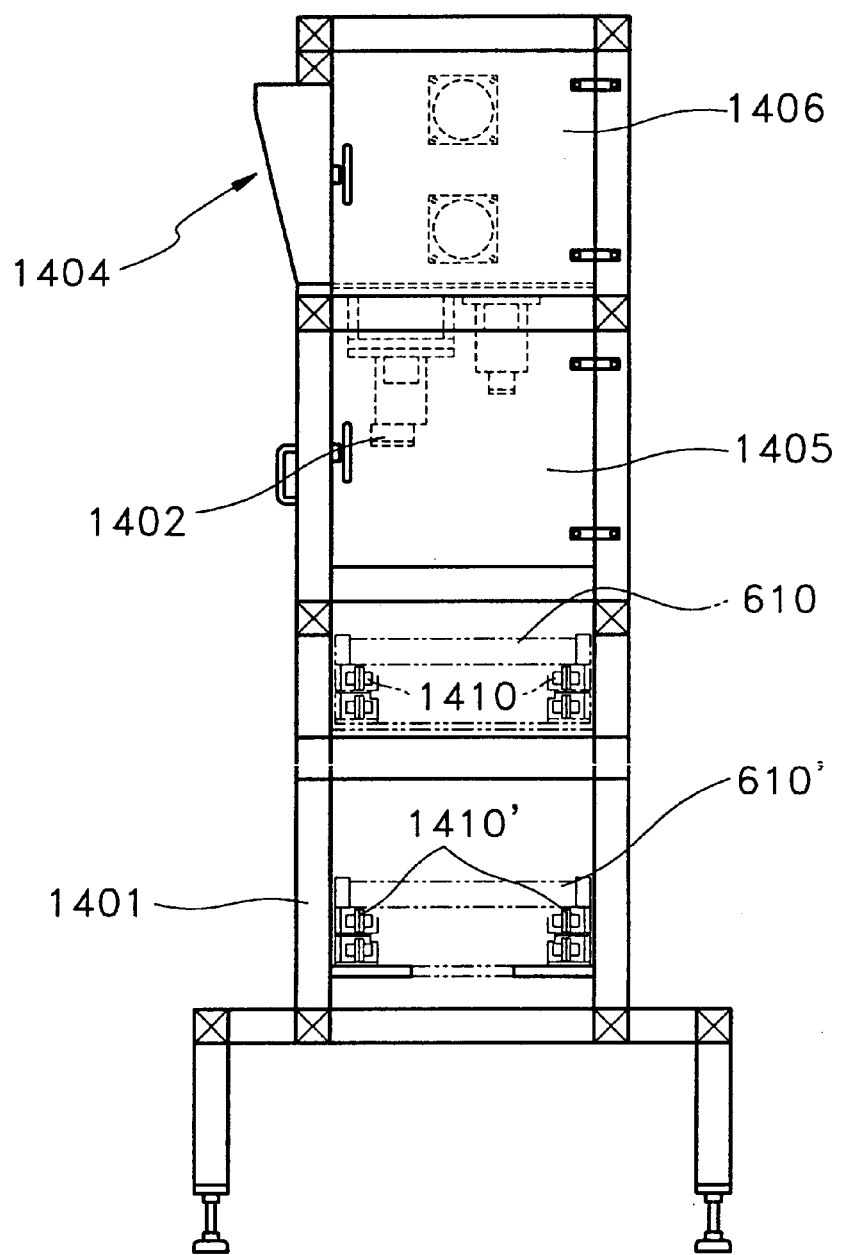
FIG. 14 is a view showing a vision tester.

FIG. 14 shows the vision inspector for checking whether a part is missing described in the above. Referring to the drawing, space for accommodating electronic equipments and a monitor 1404 provided for the vision tester is formed above a frame structure 1401. The space can be open or closed by a door 1406. The tray 610 can be transferred by a roller conveyor 1410 installed at the middle portion of the frame structure 1401. A camera device 1402 is installed above the roller conveyer 1410. The camera device 1402 can be installed in a closed space formed by the door 1405.

When the tray 610 where the tubes, the fins and the supports are loaded arrives at the upper portion of the roller conveyer 1410, the transfer of the tray 610 is stopped by a positioner (not shown) and a stopper device (not shown) for a predetermined time and pictures are taken by the camera device 1402. Whether there are missing parts in the tray 610 is determined by a computer (not shown). If there is a missing part space, the tray 610 is sent back by a tray returning device. Otherwise, the tray 610 is transferred to the subsequent step. The tray returning device consists of a common roller conveyer and a stopper. That is, by adopting a roller conveyer for selectively changing the transfer direction, the tray having a missing part space is sent back and the tray 610 with not missing part space is transferred to a discharging device. Reference numeral 610' denotes a tray awaiting in a state of being supported by the roller conveyer 1410' for returning. In the discharging device, the fins, the tubes and the supports in the tray 610 loaded in the tray 610 are discharged on a table (not shown) and the fins, the tubes and the supports are aligned in the lengthwise and widthwise directions.

Figure 15:
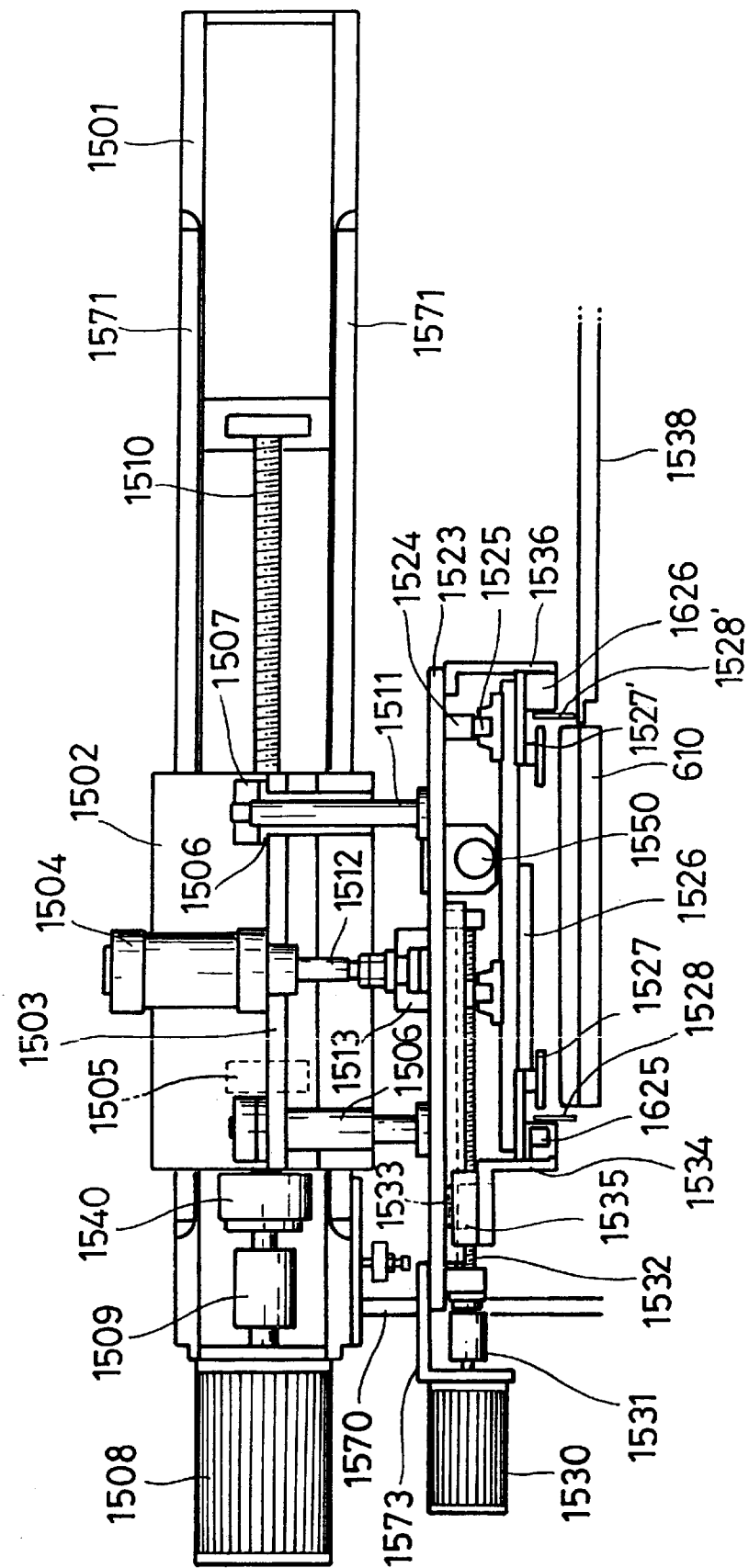
FIG. 15 is a front side view showing a discharging device of the fin, the tube and the support.

FIG. 15 is a front side view of a discharging device of the fins and the tubes. Referring to the drawing, a frame 1501 is horizontally installed at an end portion of a column 1507 vertically erected. A horizontally movable plate 1502 is installed at the frame 1501 to be capable of moving horizontally along a guide rail 1571. A nut 1505 is fixed to the rear surface of the horizontally movable plate 1502 and a ball screw 1510 is coupled to the nut 1505. The ball screw 1510 is supported by a bearing 1540 and coupled to the motor 1508 via a coupling 1509, to be capable of rotating. The horizontally movable plate 1502 can be moved by a driving force of the motor 1508 in a horizontal direction along the guide rail 1571.

A cylinder mount 1503 is installed perpendicularly at the front surface of the horizontally movable plate 1502. A cylinder 1504 and bushes 1506 are installed above the cylinder mount 1503 and bushes 1506 is fixed. An elevating plate 1523 is fixed to an end portion of a rod 1512 of the cylinder 1504 via a holder 1513. The elevating plate 1523 can ascend or descend by the operation of the cylinder 1504. The bushes 1506 fixed to the cylinder mount 1503 and guide rods 1511 fixed to the elevating plate 1523 guide the up and down movements of the elevating plate 1523. A stopper 1507 installed at an end portion of each of the guide rods 1511 restricts the descent of the elevating plate 1512.

A motor 1530 is fixed to one side of the elevating plate 1523 through a bracket 1573. The rotational driving force of the motor 1530 rotates a ball screw 1532 via a coupling 1531. The ball screw 1532 is coupled to a nut 1533. The nut 1533 is coupled to a pusher 1528 via a slide 1534. The movement of the slide 1534 is guided by a guide 1535. A block 1625 is fixed to the lower end portion of the slide 1534 and the pusher 1528 is fixed to the block 1625. Thus, when the motor 1530 rotates, the slide 1534 and the block 1625 are moved horizontally by the operation of the ball screw 1523. Accordingly, the pusher 1528 can be moved horizontally. A suspension portion 1536 is fixed to one side of the elevating plate 1523 to correspond to the pusher 1528. A fixed block 1626 is fixed to the suspension portion 1536 and a fixed pusher 1528' is installed at the fixed block 1626. When the pusher 1528 pushes the fins, the tubes and the supports, they are aligned with respect to the fixed pusher 1528'.

The pusher 1528 can align the fins, the tubes and the supports which are inserted into the tray 610. That is, as the fins, the tubes and the supports in the upper portion of the tray 610 protrude slightly higher than the height of the partition of the tray 610, when the fins, the tubes and the supports are pushed by the pusher 1528, they are aligned with respect to the fixed pusher 1528' at one side of the tray 610. Here, to prevent the fins having elasticity spring up, a fin protecting plate 1527 is installed at the slide 1534. Also, another fin protecting plate 1527' is installed at the fixed block 1626.

A saddle 1526 is installed at the low surface of the elevating plate 1524. The saddle 1526 operated by the cylinder 1550 can be guided by a guide 1525. Also, when the cylinder 1550 is in a load-less state, the saddle 1526 can be guided by the operation of other cylinder described later.

Figure 16:
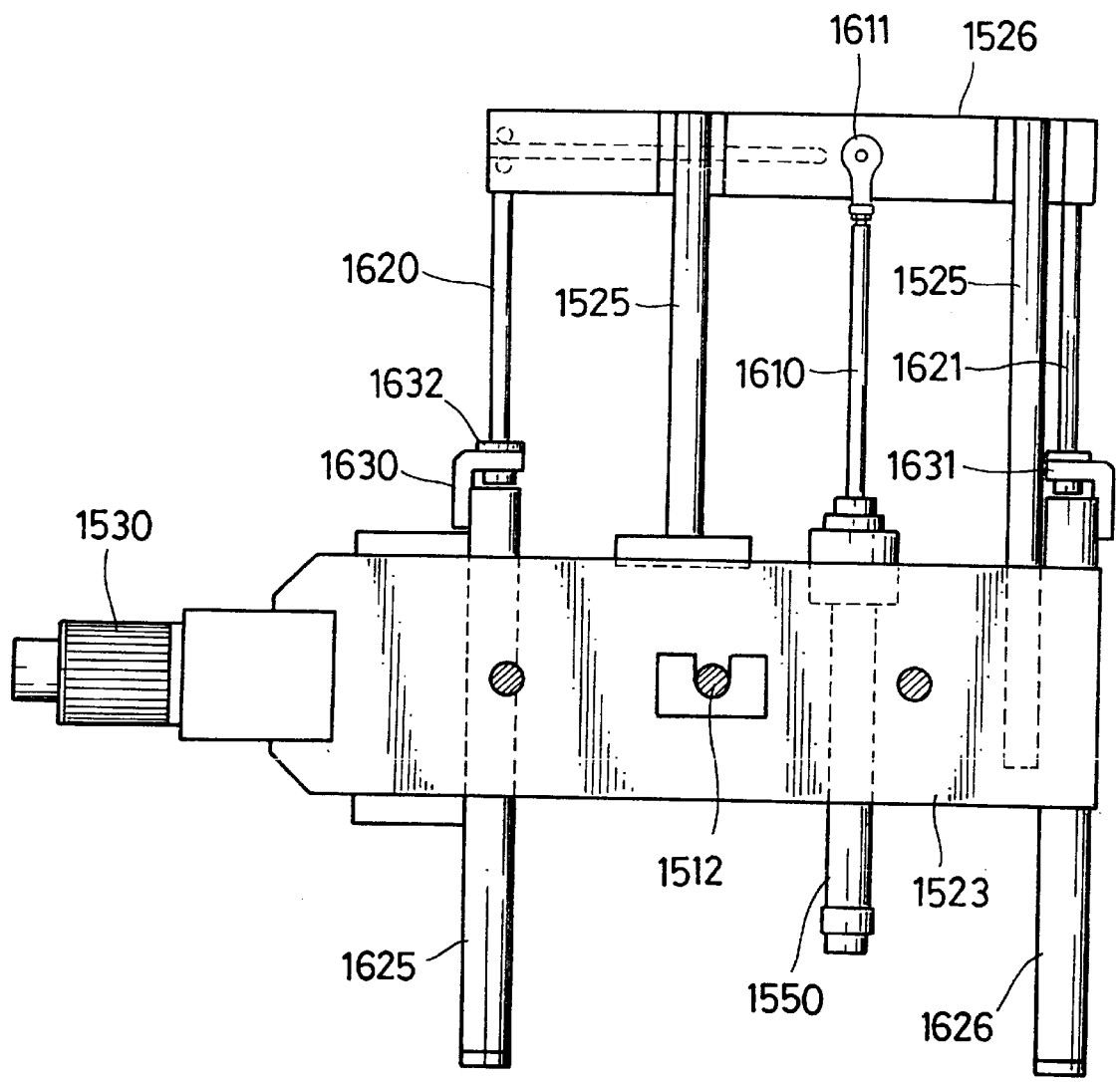
FIG. 16 is a plan view showing a part of the discharging device of FIG. 15.

FIG. 16 is a plan view of a part of the discharging device shown in FIG. 15. Referring to the drawing, a pair of guides 1525 parallel to the cylinder 1525 are installed at the low surface of the elevating plate 1523. It can be seen that the saddle 1526 can move in the lengthwise direction of the cylinder 1550 by the operation of the cylinder 1550 and the guide 1525. A rod 1610 of the cylinder 1550 is coupled to the saddle 1526. Also, rods 1620 and 1621 connected to the blocks 1625 and 1626 via brackets 1630 and 1631 and bushes 1632 and 1633 can be moved through the bushes 1632 and 1633 when the saddle 1526 horizontally moves. As the block 1625, as described in FIG. 15, can move in a direction perpendicular to the lengthwise direction of the block 1625 in FIG. 16, the end portion of the rod 1620 connected to the blocs 1625 is installed to be capable of moving with respect to the saddle 1526.

Figure 17:
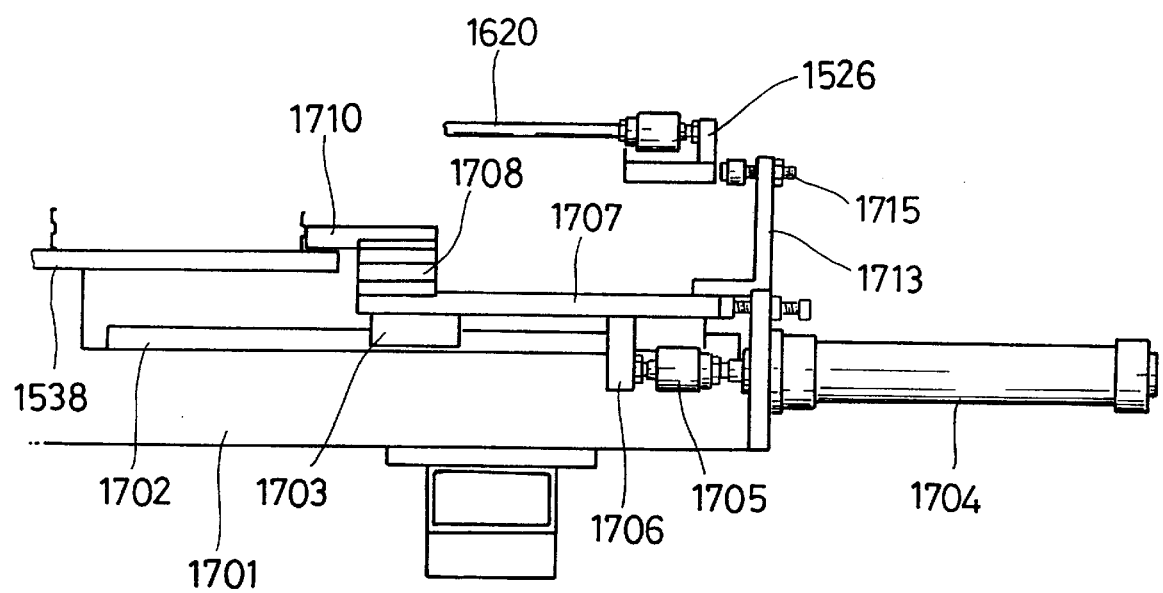
FIG. 17 is a front side view showing another part of the discharging device.

FIG. 17 is a front-view of other parts of the discharging device for pressing the fins, the tubes and the supports placed on the table 1538. Referring to the drawing, there are the table 1538 and the saddle 1526 of the discharging device shown in FIG. 15. When the fins, the tubes and the supports are placed on the upper surface of the table 1538, a pusher 1710 can be moved to reduce the distance therebetween. A guide rail 1702 is fixed to a frame 1701 under the table 1538. A slide 1703 is guided by and moves horizontally along the guide rail 1702. A slide block 1707 and a block 1708 are fixed to the slide 1703 and can be moved horizontally by the operation of the cylinder 1704. A rod of the cylinder 1704 is connected to a block 1706 through a coupling 1705 and the block 1706 is connected to the slide block 1707. A bracket 1713 is fixed to the slide block 1707 and a pusher bolt 1715 is fixed to the bracket 1713. The pusher bolt 1715 can push the saddle 1526.

The discharging device and the devices for alignment shown in FIGS. 15, 16 and 17 operate as follows. When the tray 610 arrives at the discharging device by the conveyer device, the elevating plate 1523 descends by the operation of the cylinder 1504 so that the pusher 1528 is ready to push the fins, the tubes and the supports loaded in the tray 610. Next, as the motor 1530 operates, the pusher 1528 pushes the fins, the tubes and the supports in the lengthwise direction thereof with respect to the fixed portion 1528' to align them by the power transfer of the ball screw 1532 and the nut 1533 and the guiding operation of the guide 1535.

Next, when the motor 1508 rotates, the horizontally movable plate 1502 moves horizontally by the power transfer of the ball screw 1510 and the nut 1505 and the guiding operation of the guide rail 1571. Here, the fins, the tubes and the supports loaded in the tray 610 can be moved to the upper surface of the table 1538.

Then, the pusher 1710 shown in FIG. 17, pushes the fins, the tubes and the supports placed on the table 1538 in the widthwise direction thereof to align them. This is made possible as the cylinder 1704 pushes the slide block 1707. Here, the pusher 1710 contacts the supports arranged at the outermost side and pushes them against other fixed portion (not shown) to align them.

Figure 18:
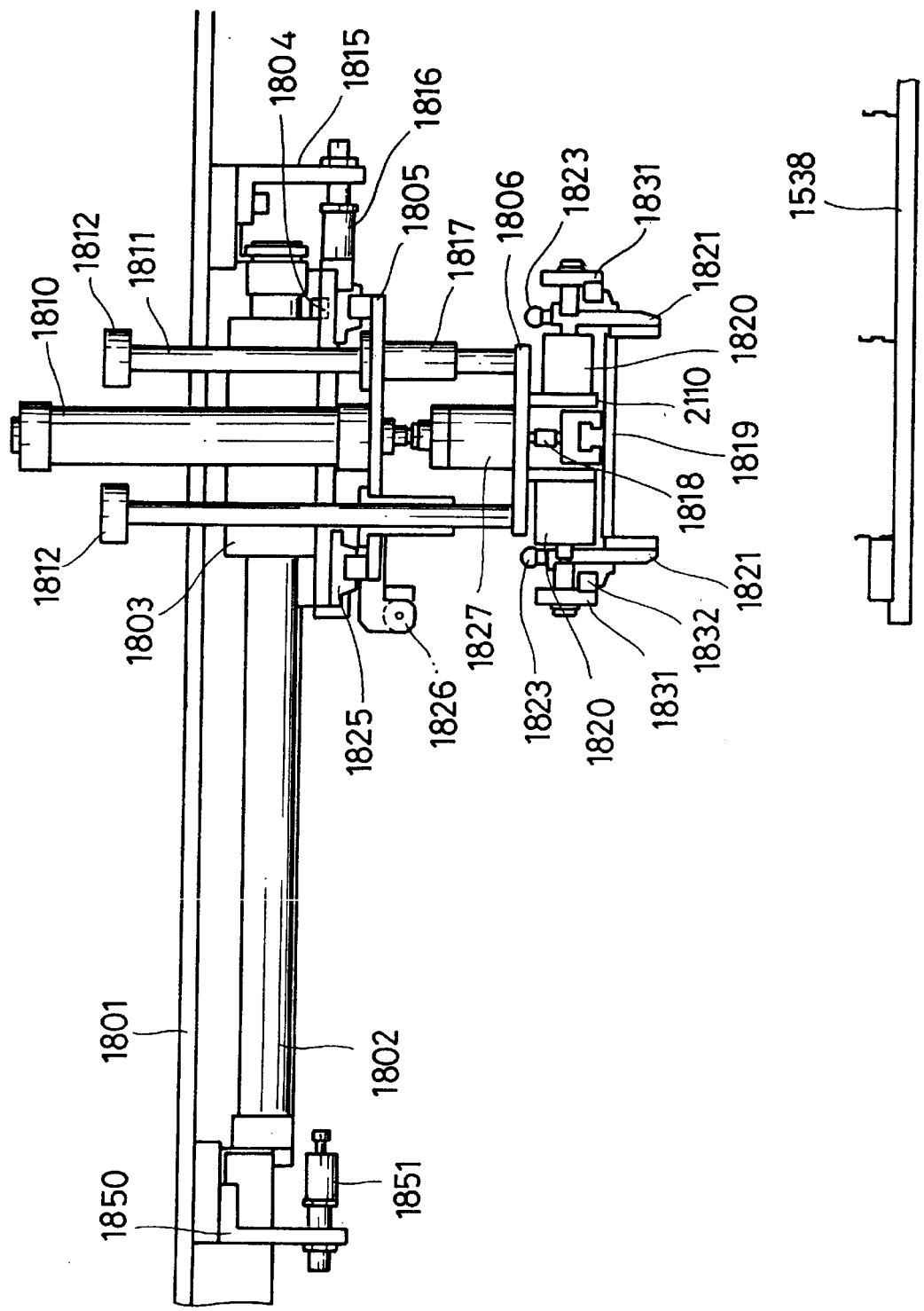
FIG. 18 is a front side view showing a transfer device of the fin, the tube and the support.

FIG. 18 shows a transfer device for transferring the fins, the tubes and the supports to be aligned with one another. The transfer device picks up the fins, the tubes and the supports in the state of being aligned on the table 1538, as shown in FIG. 15, and transfer them to the subsequent step of a header assembly.

Referring to FIG. 18, a rod-less cylinder 1802 is installed at a frame 1801. A transfer portion 1803 can reciprocate in the horizontal direction by the operation of the cylinder 1802. A plate 1804 is fixed to the transfer portion 1803. Thus, the plate 1804 can move together when the transfer portion 1803 reciprocates in the horizontal direction. Both end portions of the rod-less cylinder 1802 are fixed to the frame 1801 through holders 1815 and 1850. Also, buffers 1816 and 1851 are installed at the holders 1815 and 1850, respectively, so that movement of the plate 1804 can be buffered.

A guide 1825 is installed at the bottom surface of the plate 1804. The guide 1825 guides movement of a slide 1805. The slide 1805 can be moved along the guide 1825 by a cylinder 1826 installed at the plate 1804.

A cylinder 1810 is vertically installed on the slide 1805. Also, a bush 1817 is fixed at each lateral side of the cylinder 1810. A lower end portion of a bar 181 guided by the bush 1817 is fixed to a cylinder mount 1806. A stopper 1812 is fixed to an upper end portion of the bar 1811 so that the upper end portion of the bar 1811 is prevented from completely escaping through the bush 1817. Another cylinder 1827 is installed on the upper portion of the cylinder mount 1806. An end portion of a rod of the cylinder 1810 installed on the slide 1805 is fixed to the upper portion of the cylinder 1827 installed on the cylinder mount 1806. Thus, the cylinder mount 1806 can be moved up and down by the operation of the cylinder 1810.

A cross bar 2110 is fixed on the bottom surface of the cylinder mount 1806. A fin processing portion 1819 is installed between the cross bar 2110 and the fin pressing portion 1819 can be moved up and down by the cylinder 1827. A cylinder 1820 is fixed at each lateral sides of the cross bar 2110. The end portion of a rod of the cylinder 1820 is connected to a plate 1831. Thus, the distance between the plates 1831 becomes narrow or wide by the operation of the cylinder 1828.

A guide 1832 is installed at-the plate 1831. A jaw 1821 is guided by the guide 1832. The operation of the jaw 1821 is achieved by the cylinder 1823 disposed above, which will be described in detail later. The jaw 1821 directly contact the fins, the tubes and the supports to pick them up and transfer. Although only two jaws 1821 are shown in FIG. 18, four jaws are actually provided and the distance therebetween can be decreased or increased.

Figure 19:
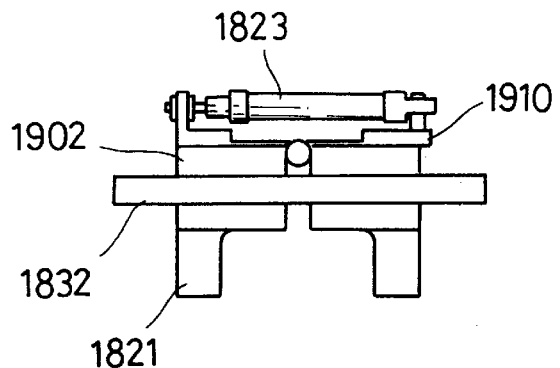
FIG. 19 is a side view showing a part of a jaw device.

FIG. 19 shows a jaw device for guiding the jaw 1821 along the guide 1832. Referring to the drawing, two slides 1902 are installed at the guide 1832 to be capable of being narrowed or widened with respect to each other. Each of the slides 1902 is connected to the jaw 1821 so that the slide 1902 moves together with the movement of the jaw 1821. The upper end portion of the slide 1902 is connected to each end portion of the cylinder 1823. Thus, as the cylinder 1823 is compressed or expands, the slides 1902 can be closer to or separated from each other. Accordingly, the distance between the jaws 1821 varies.

Figure 20:
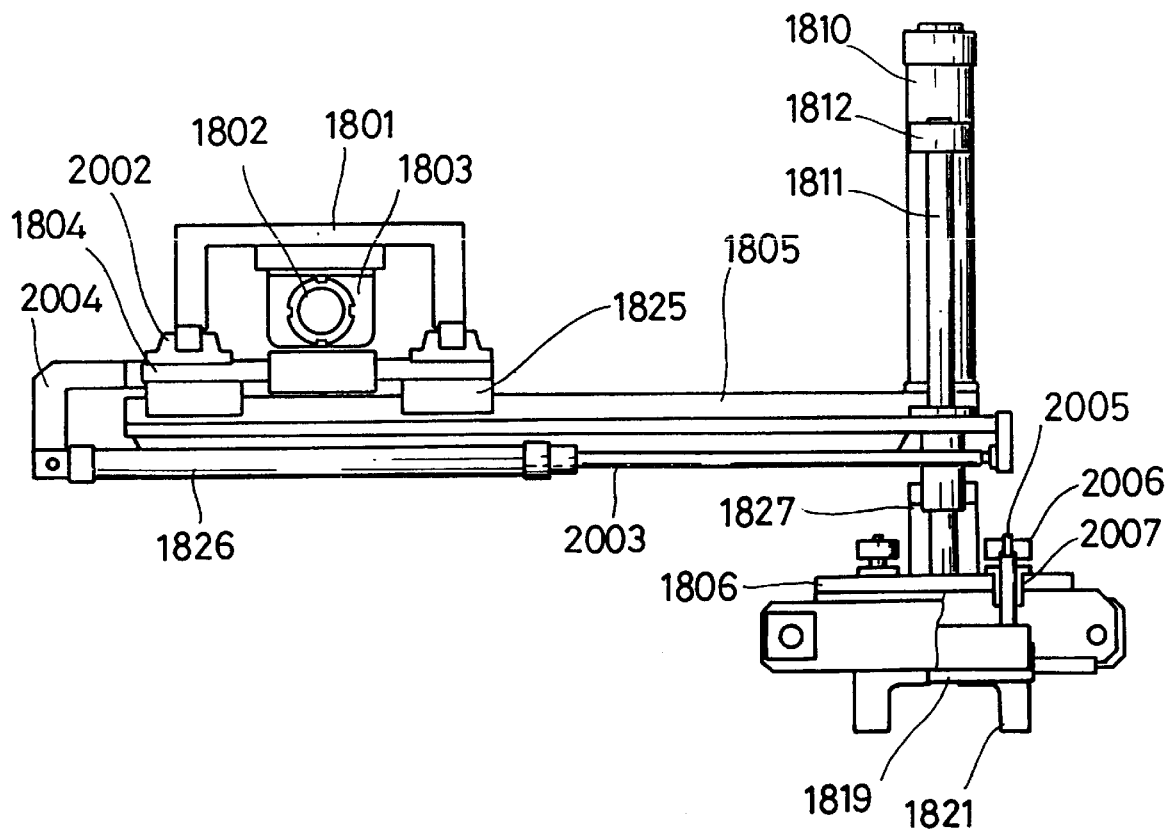
FIG. 20 is a right side view showing the transfer device of FIG. 18, viewed from the left side thereof.

FIG. 20 is a left side view of the transfer device of FIG. 18. Referring to the drawing, the rod-less cylinder 1802 and the transfer portion 1803 are installed to the frame 1801. Also, the cylinder 1826 is fixed to the plate 1804 through a bracket 2004 and the slide 1805 moves along the guide 1825 by the operation of the cylinder 1826.

A bar, denoted with reference number 2005 in FIG. 18, is connected to the upper portion of the pin processing portion 1819. The bar 2005 is inserted in a bush 2007 installed at the cylinder mount 1806 and guides the descent of the fin pressing portion 1819. A stopper 2006 is installed at the upper end portion of the bar 2005 so that the bar 2005 is prevented from escaping from the bush 2007.

Figure 21:
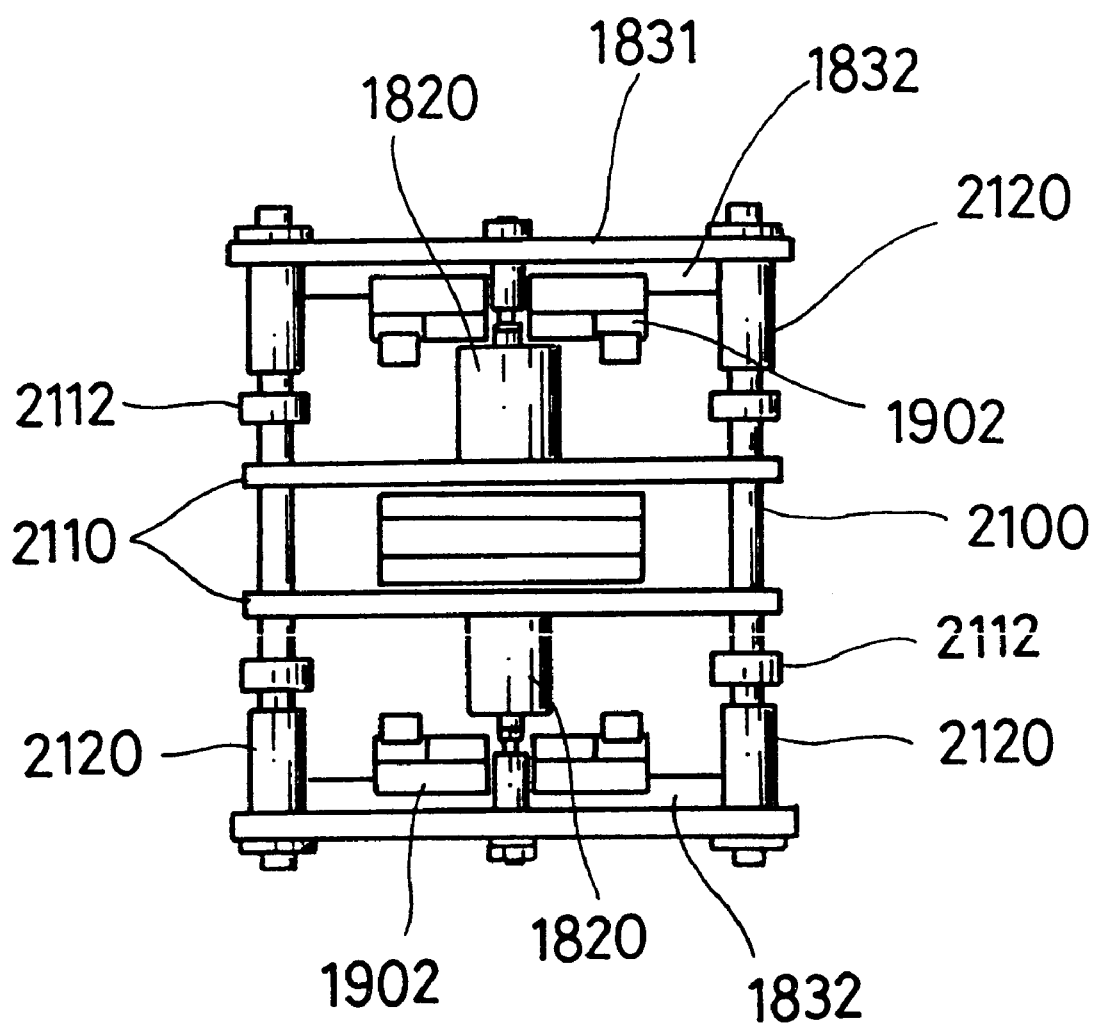
FIG. 21 is a plan view of a part of the jaw device.

FIG. 21 shows the bottom of the cylinder mount 1806 of FIG. 18 to show the jaw device. Referring to FIG. 21, both end portions of the cross bars 2110 are fixed to the parallel guide bars 2100. The cylinder 1820 is fixed to the side surface of the cross bar 2110 and the end portion of the rod of the cylinder 1820 is connected to the plate 1831. A bush 2120 is installed at each side of the plate 1831 and a guide bar 2100 is installed through the bush 2120. A collar 2112 is fixed to the guide bar so that the bush 2020 is prevented from moving along the guide bar 2100. The guide 1832 is installed at the plate 1831 and the slide 1902 where the jaw 1821 (see FIG. 19) is fixed can be moved through the guide 1832.

The plates 1831 can move to be close to or separated form each other by the operation of the cylinder 1820. Thus, the slides 1902 where the jaw 1821 is fixed can be close to or separated from each other in the lengthwise direction of the guide bar 2100. Also, by the operation of the cylinder 1823 described with reference to FIG. 19, the slide 1902 is moved to be close to or separated from each other in the direction in which the guide 1832 guides.

In the operation of the transfer device described in FIGS. 18 through 21, the fins, the tubes and the supports are disposed in a predetermined aligned state on the table 1538. Here, the transfer portion 1803 is moved horizontally in the first direction by the operation of the cylinder 1802 while the slide 1805 is moved horizontally in the second direction perpendicular to the first direction by the operation of the cylinder 1826, so that the jaw 1821 is moved on a predetermined position of the table 1538. Next, as the cylinder mount 1806 descends by the operation of the cylinder 1810, the jaw 1821 descends to the position where the fins, the tubes and the supports on the table 1538 can be gripped.

As the distance between the jaws 1821 decreases, the fins, the tubes and the supports can be gripped in an aligned state. That is, the distance between the jaws 1821 can be decreased in a direction perpendicular to each other by the operation of the cylinder 1820 and the other cylinder 1823 and accordingly the fins the tubes and the supports can be gripped in a stable state.

When the above gripping process is completed, the fins, the tubes and the supports are transferred to the subsequent step, that is, the header assembly step, in the inverse order of the above-described operations. That is, the cylinder mount 1806 ascends and the fins, the tubes and the supports are transferred to a predetermined position in the header assembly step by the operations of the slide 1805 and the plate 1804.

Figure 22:
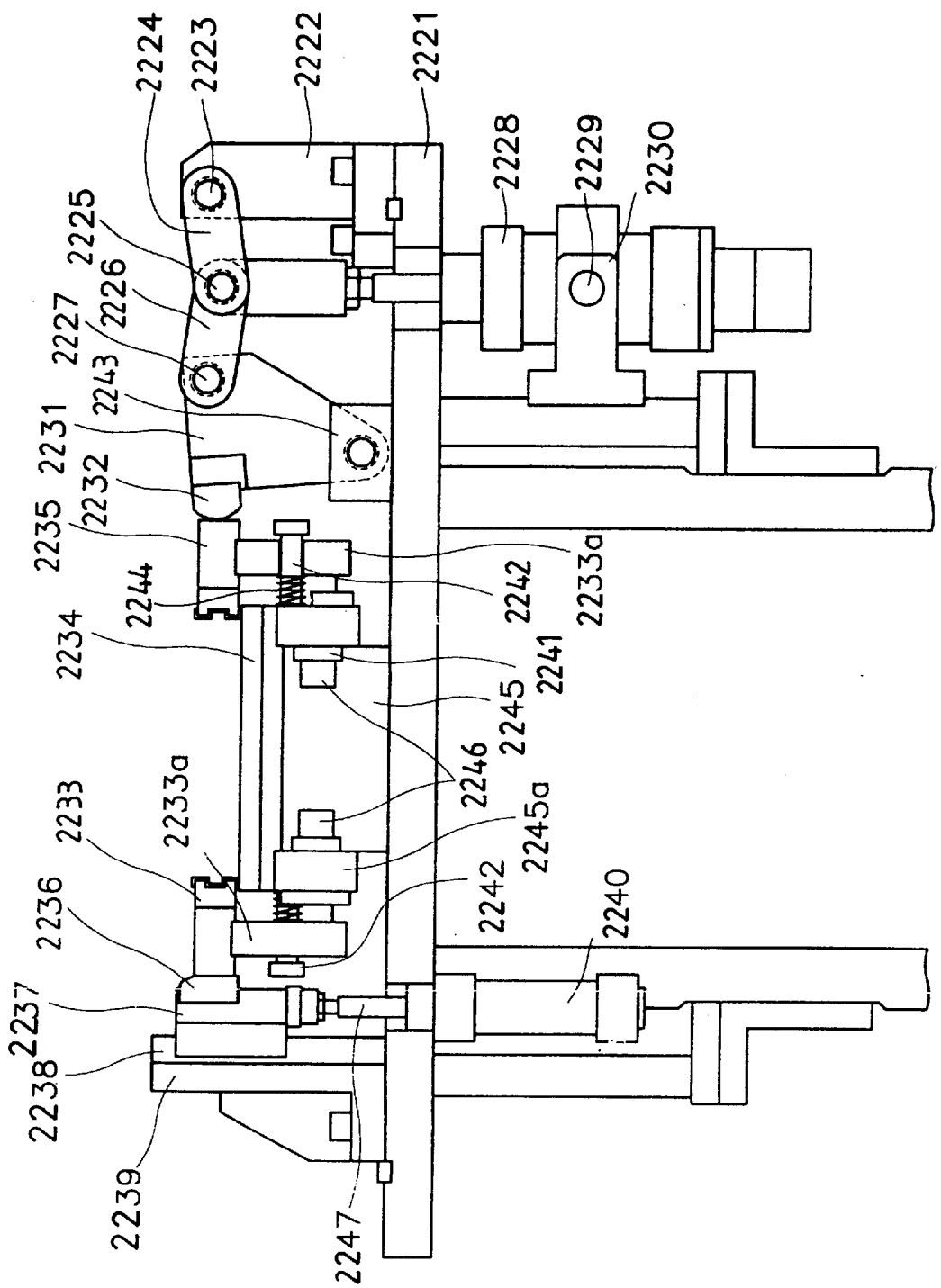
FIG. 22 is a front side view showing only a gripper device of a header assembling apparatus.

FIG. 22 shows a pressing device provided in the header assembling device for fixing the tubes 11, the fins 12 and the supports 13 of the heat exchanger. Referring to the drawing, the tubes 11, the fins 12 and the supports 13 are arranged at the respective regular positions in the previous step and then transferred to the upper surface of a table 2234 of the header assembling apparatus by the transfer device (not shown). First and second pressing blocks 2233 and 2235 are installed at both sides of the table 2234. The pressing blocks 2233 and 2235 move toward the center of the table 2234 at fine intervals, an assembly of parts of the heat exchanger placed between the pressing blocks 2233 and 2235 can be pressed. Such a pressing step corresponds to a step of preparation of assembling a header 44 to each end portion of the tubes 11.

The table 2234 is fixed to a base 2221 through a block 2245. A block 2245a is fixed to the bottom surface of the table 2234 and a bush 2241 is installed in the block 2245a. A guide 2246 can be transferred in the horizontal direction through the bush 2241. A support portion 2233a is installed at an end portion of the guide 2246 and the pressing blocks 2235 and 2233 are supported by the gripper support portion 2233a.

Figure 23:
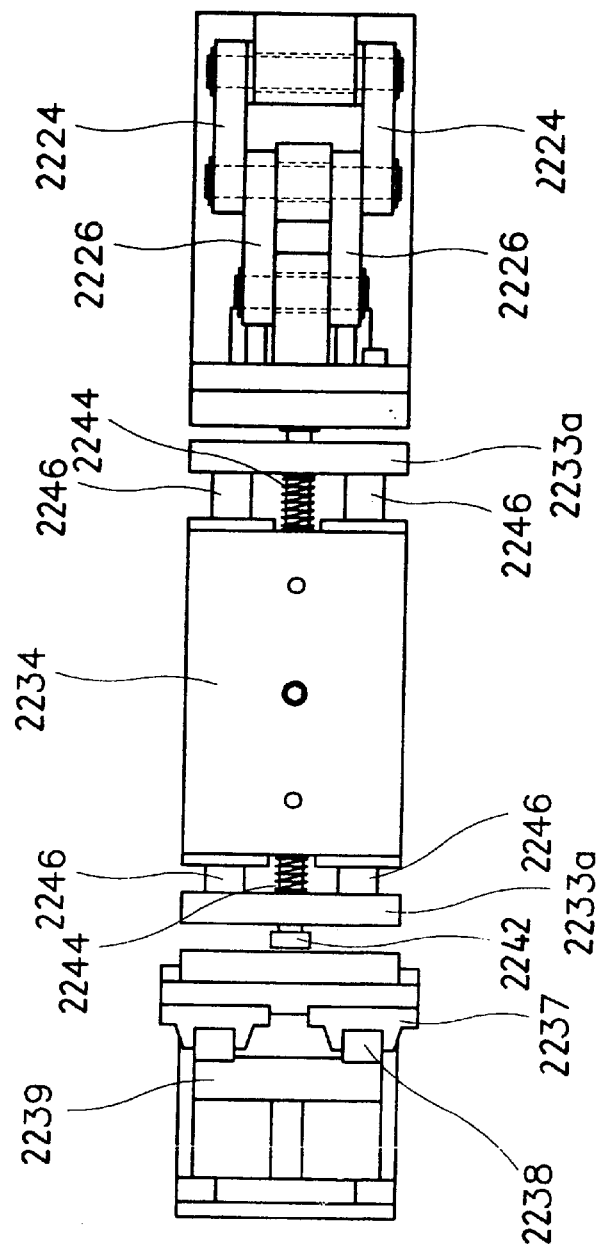
FIG. 23 is a plan view showing a part of the gripper device of FIG. 22.

FIG. 23 is a plan view of the gripper device of FIG. 22. Referring to the drawing, it can be seen that the guides 2246 shown in FIG. 22 are installed parallel to each other in the lengthwise direction of the table 2234. A spring 2244 is installed so that the pressing blocks 2233 and the 2235 are elastically biased in the directions in which they are separated from each other.

Referring back to FIG. 22, it can be seen that an elastic force by the spring 2244 causes the first and second pressing blocks 2233 and 2235 to separated from each other.

A taper plate 2236 detachably contacts one end portion of the first pressing block 2233. The tape plate 2236 is fixed to the slide 2237 and the slide 2237 can move up and down along the guide 2238. The guide 2238 is fixed to a bracket 2239 installed at the base 2221. A cylinder 2240 is installed under the base 2221 and a rod 2247 of the cylinder 2240 is fixed to the lower portion of the slide 2237. When the slide 2237 is raised, the surface of the pressing block 2233 forms a reference surface for pressing the tubes, the fins and the supports.

When the rod 2247 of the cylinder 2240 is compressed, the slide 2237 and the taper plate 2236 fixed thereto descends along the guide 2238. When the rod 2247 expands, the taper plate 2236 ascends along the guide 2238. The taper plate 2236 can descend to the position where it is completely separated from the first pressing block 2233. Thus, the gripper support portion 2233a and the fist pressing block 2233 can be moved to the position which is allowed by the stop pin 2242 due to an elastic biasing force by the spring 2244. As can be seen from the drawing, the upper end portion of the taper plate 2236 contacting the pressing block 2233 is tapered. Thus, when the descending taper plate 2236 ascends, the tapered portion of the taper plate 2236 pushes the pressing block 2233 to the right in the drawing. That is, the first cylinder 2240 moving up pushes the first pressing block 2233 to the right and, as the first cylinder 2240 moving down, the first pressing block 2233 is moved to the left side by the spring 2244. In the above operation of the pressing block 2233, the guide 246 functions as a guiding role.

The second pressing block 2235, as shown in the drawing, is supported by the support portion 2233a and installed to be capable of moving along the guide 2246. Also, as the stop pin 2242 is installed, the elastic biasing by the spring 2244 is restricted. That is, the movement of the second pressing block 2235 with respect to the table 2234 is the same as that of the first pressing block 2233. However, the method of transferring the power to the second pressing block 2235 to move against the force of the spring 2244 is different from that of the first pressing block 2233.

One side of the second pressing block 2235 contacts a pusher 2232. The pusher 2232 is fixed to one end portion of a lever 2231 rotatably installed. The lever 2231 is rotatably installed by a pin at a block 2243 fixed to the base 2221. One end of a link 2226 is coupled to one side of the lever 2231 and another link 2224 is coupled to the other end of the link 2226. One end of another link 2224 is rotatably coupled to a bracket 2222 fixed to the base 2221. Each ends of the links 2226 and 2224 are coupled coaxially to a hinge 2225 to be capable of rotating. The hinge 2225 is formed at an end portion of a rod of a second cylinder 2228. The second cylinder 2228 is installed at the lower surface of the base 2221 and the rod of the second cylinder 2228 expands through a hole formed in the base 2221. The second cylinder 2228 is installed at the lower surface of the base 2221 to be capable of rotating around a hinge 2229 with respect to a bracket 2230.

When the rod of the second cylinder 2228 is compressed, the links 2226 and 2224 are rotated to form a V-shape and accordingly the lever 2231 rotates clockwise. Thus, the pusher 2232 pushing the pressing block 2235 moves away from the pressing block 2235. The pressing block 2235 is pushed to a range allowed by the stop pin 2242 by a biasing force of the spring 2244. When the rod of the second cylinder 2228 expands, the links 2226 and 2224 form an almost linear shape and accordingly the lever 2231 rotates counterclockwise. Here, the pusher 2232 pushes the pressing block 2235.

In the actual operation of the pressing device, when the transfer device arranges on the table 2234 the fins, the tubes and the supports in a state in which a header is not assembled, the pressing blocks 2233 and 2235 maintains a separated state by the compression of the cylinders 2240 and 2228. Next, when the arrangement of the fins, the tubes and the supports is completed, the pressing blocks 2233 and 2235 press the support of the heat exchanger assembly toward the center as the cylinders 2240 and 2228 expand. Thus, the distance between the parts of the heat exchanger decreases and the header can be assembled with respect to the end portion of the tube.

Figure 24:
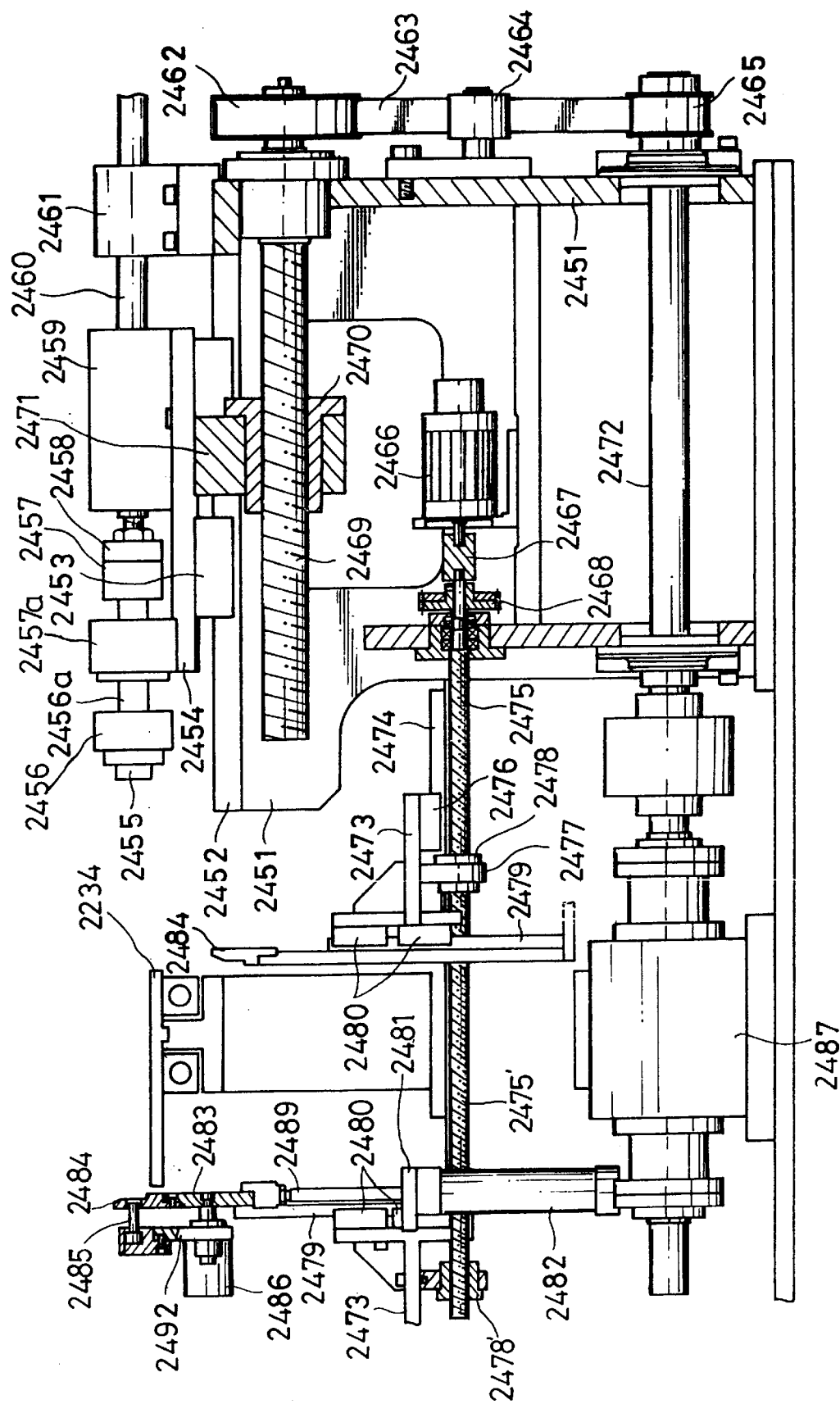
FIG. 24 is a front side view showing a part of a picket device and a part of a header insertion device of the header assembling apparatus.

FIG. 24 shows a transfer device and a picket device of a header assembler provided in the header assembling apparatus. The transfer device and the picket device of the header assembler are provided in front of and to the rear of the table 2234 of FIG. 22, respectively. That is, the gripper 2235 installed at the right and left sides of the table 2234 presses the support 13 of the heat exchanger assembly in which the header is not assembled, and simultaneously, the transfer device and the picket device of the header assembler are installed in front of and to the rear of the table 2234, respectively. The transfer device of the header assembler enables the header assembler which will be described later to approach or escape with respect to the table 2234. The picket device can be elevated or transferred in the horizontal direction with respect to the table 2234. From the above-description, the correlation between the table 2234 and the pressing device, and the transfer device and the is 1d picket device of the header assembler can be understood.

In FIG. 24, the identical picket devices are closely installed at the left and right sides of the table 2234. (That is, the identical picket devices are installed close-to the front and rear sides of the table 2234 in FIG. 22.) A structure for elevating the picket device is shown at the left side of the table 2234 in FIG. 24 while a structure for 20 transferring the picket device is shown at the right side thereof.

Referring to the drawing, the picket device includes a tube guide 2484, a plurality of pickets 2485 installed to be capable of inserting through the tube guide 2484, a picket plate 2492 elevating while maintaining the pickets 2485, a cylinder 2486 fixed to the picket plate 2492, a lift plate 2483 extending from the lower portion of the tube guide 2484, to which an end portion of a rod of the cylinder 2486 is fixed, and a cylinder 2482 for elevating the lift plate 2483. The cylinder 2482 is fixed to a cylinder mount 2481 and the cylinder mount 2481 is fixed to a slide bracket 2473.

Figure 25:
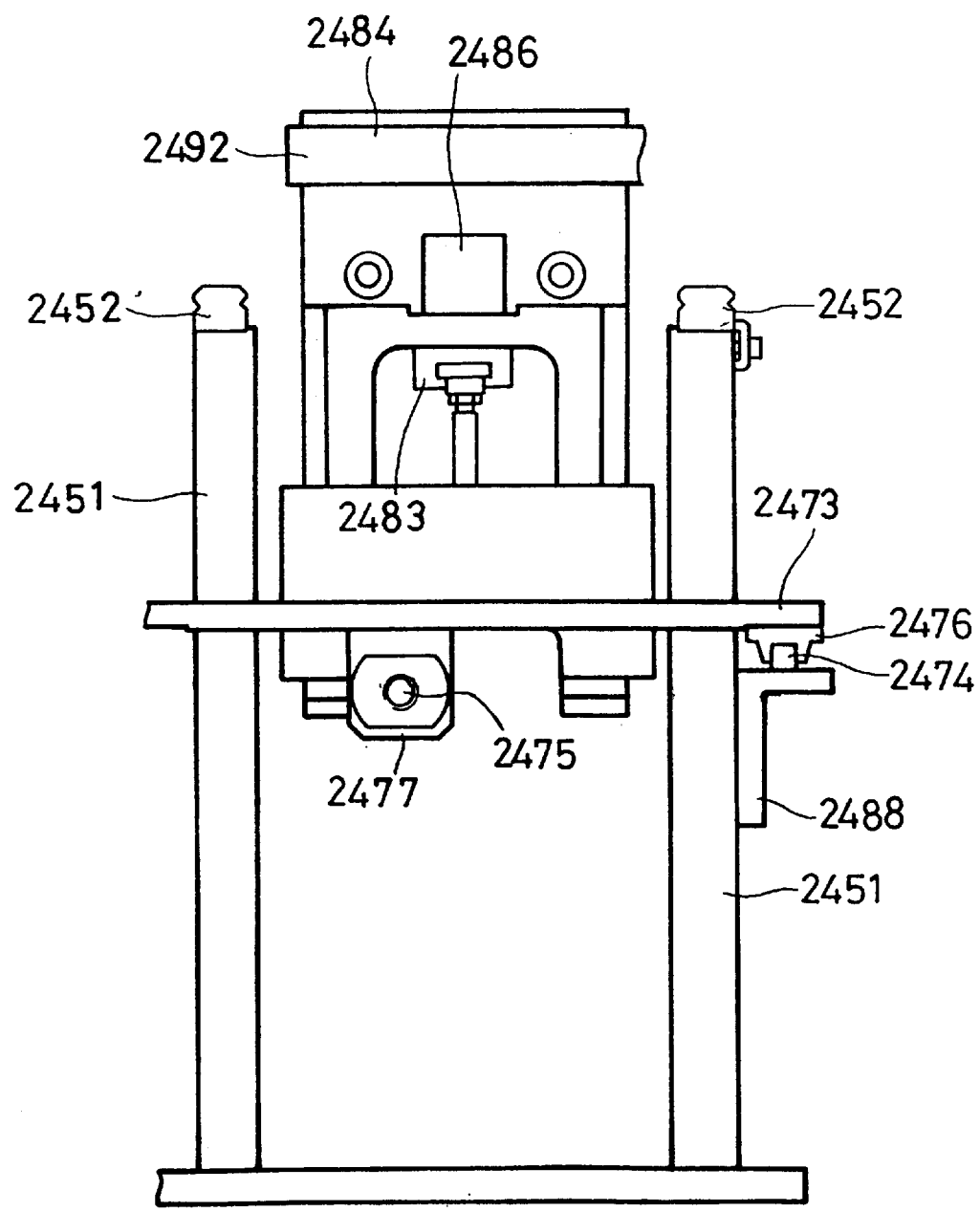
FIG. 25 is a left side view a part of the picket device and a part of the header insertion device of FIG. 24.

The slide bracket 2473 allows the overall picket device to move in the left and right directions in FIG. 24. That is, a guide 2476 is fixed to the lower portion of the slide bracket 2473 and the guide 2476 can move horizontally along a rail 2474. The rail 2474 is fixed to a beam 2488 shown in FIG. 25. The beam 2488 is extended horizontally from the lower portion of the frame 2451 in FIG. 24.

As described above, the lift plate 2483 and the picket plate 2492 can ascend or descend with respect to the side surface of the table 2234 by the operation of the cylinder 2482. The operation of the lift plate 2483 is stably achieved as a slide 2479 fixed to the lift plate 2483 is guided along a guide 2480 fixed to the slide bracket 2473. Such a guiding structure is well shown particularly in the right side of the table 2234. In the drawing, the lift plate 2483 at the left side of the table 2234 is in an ascended state while the lift plate 2483 at the right side thereof is in a descended state.

A block 2477 is fixed to each slide bracket 2473 at the left and right sides. Nuts 2478 and 2478' coupled to ball screws 2475 and 2475' are installed in the block 2477. The ball screws 2475 and 2475' are extended through the nuts 2478 and 2478' fixed to each slide brackets 2473 and one end of the ball screws 2475 is connected to a servo motor 2466 through a gear 2468 and a coupling 2467. A gear (not shown) is installed at the end portion of the ball screw 2475' which is not shown. The gear 2468 is engaged with the gear of the ball screw 2475' which is not shown so that the ball screws 2475 and 2475' rotate in the directions opposing each other. That is, as the ball screws 2475 and 2475' are configured dually, when the servo motor 2466 rotates, the bracket 2473 facing each other can move in the opposite direction at the time of rotation of the servo motor 2466. The servo motor 2466 is installed in the lower portion of the frame 2451. As the ball screws 2475 and 2475' rotate, the left and tight slide brackets 2473 horizontally move to be close to or separated form each other. The movement of the slide bracket 2473 results in the movement of the entire picket device.

As described above, the picket device including the picket plate 2492 and the lift plate 2483 can be elevated by the operation of the cylinder 2482 and horizontally move by the operation of the servo motor 2466. Practically, the elevation and the horizontal movement of the picket plate 2492 are performed to prevent interference between a header fitting work and a picket work which will be described later.

Figure 26:
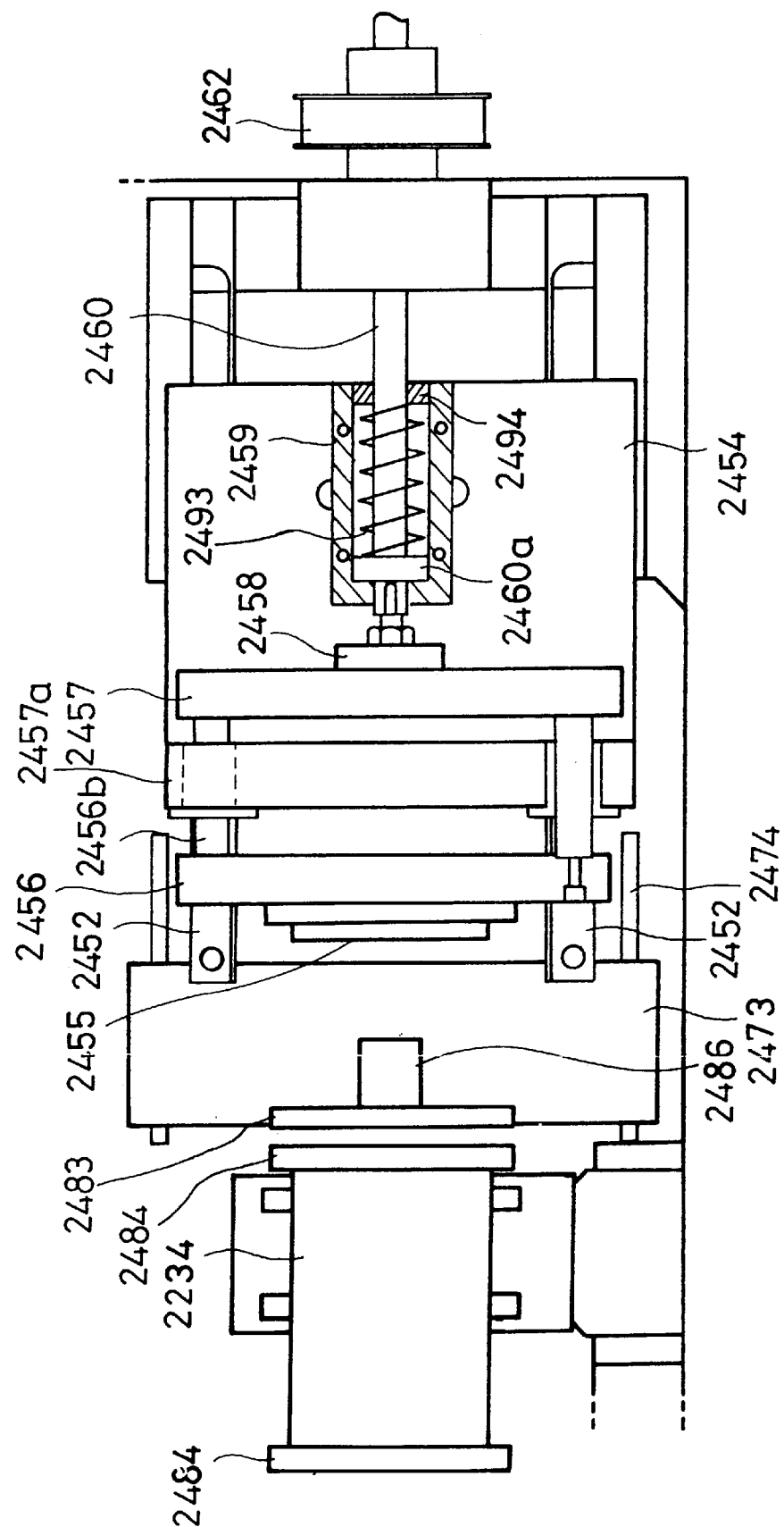
FIG. 26 is a plan view showing a part of the picket device and a part of the header insertion device of FIG. 24.

In FIG. 24, the structural elements installed at the frame 2451 excluding the servo motor 2466 are for the transfer device of the header assembler. Referring to FIGS. 24 and 26, the transfer device of the header assembler includes a frame 2451, a rail 2452 fixed to the upper portion of the frame 2451, a guide 2453 horizontally moving along the rail 2452, a slide 2454 fixed to the guide 2453, a spring housing 2459 installed at the upper portion of the slide 2454, a bar 2460 extending through the spring housing 2493, a pusher 2458 fixed to one end portion of the bar 2460, a beam 2457a fixed to the upper surface of the slider 2454, a rod 2456a movably extending through a hole formed in the beam 2457a, and a header main body 2456 and a tool main body 2455 installed at the end portion of the rod 2456a. The other end portion of the rod 2456a is fixed to the beam 2457.

The pusher 2458 fixed to the end portion of the bar 2460 receives impact transferred from the beam 2457 via the pusher 2458. Such impact can be removed by being buffered by a spring in the spring housing 2459, which will be described in detail later. The end portion of the bar 2460 is inserted in the collar 2461.

The slide 2454 can be moved in the horizontal direction by the operation of a ball screw 2469 and a nut 2470 installed in the lower portion of the frame 2451. A connector 2471 is installed at the outer circumferential surface of the nut 2470 and is fixed to the slide 2454. A pulley 2462 is installed at one end portion of the ball screw 2469. The pulley 2462 is connected via a belt 2463 to a pulley installed at an end portion of a rotary shaft 2472 rotating by a driving force of a servo motor 2487. A roller 2464 may be installed to maintain tension of the belt 2463.

FIG. 26 is a partially sectional view showing the inner structure of the spring house 2459. Referring to the drawing, the bar 2460 is installed in the spring housing 2459 by penetrating the same. A spring 2493 is installed around the outer circumferential surface of the bar 2460. Also, the bar 2460 is coupled to a nut 2494 to be capable of sliding. The outer circumferential surface of the nut 2494 is threaded to be coupled to a threaded surface formed on the inner circumferential surface of the spring housing 2459. Reference numeral 2460a denotes a sectional extension portion of the bar 2460. One end of the spring 2493 is supported by the sectional extension portion 2460a and the other end thereof is supported by the nut 2494. Thus, when the pusher 2458 receives impact from the beam 2457, the sectional extension portion 2460a compresses the spring 2493 with respect to the nut 2494 to buffer the impact.

Referring back to FIG. 24, in an assembly of a header by a tool (which will be described in detail later) installed at the tool main body 2455, when the servo motor 2487 rotates, a rotational driving force is transferred to the pulley 2462 via the pulley 2465 and the belt 2463. As the ball screw 2469 of which the one end portion is coupled to the pulley 2402 rotates, the nut 2470 can move horizontally in the lengthwise direction of the ball screw 2469. Thus, the stride 2454 coupled to the nut 2470 can be transferred in the horizontal direction above the frame 2451 by the guiding operation of the guide 2453 and the rail 2452. A tool (not shown) is installed at the tool main body 2455 which will be described in detail later. The tool is for assembling the header 14 with each end portion of the tubes 11. To perform the header assembly work, the slider 2454 approaches the table 2234. The header 11 maintained by the tool installed at the tool main body 2455 approaches and contacts the tubes 11 of the heat exchanger fixed on the table 2234. In doing so, impact is generated and the generated impact is transferred to the beam 2457 via the rod 2456a. The transferred impact can be buffered by the spring 2493 through the pusher 2458 and the bar 2460.

Figure 27:
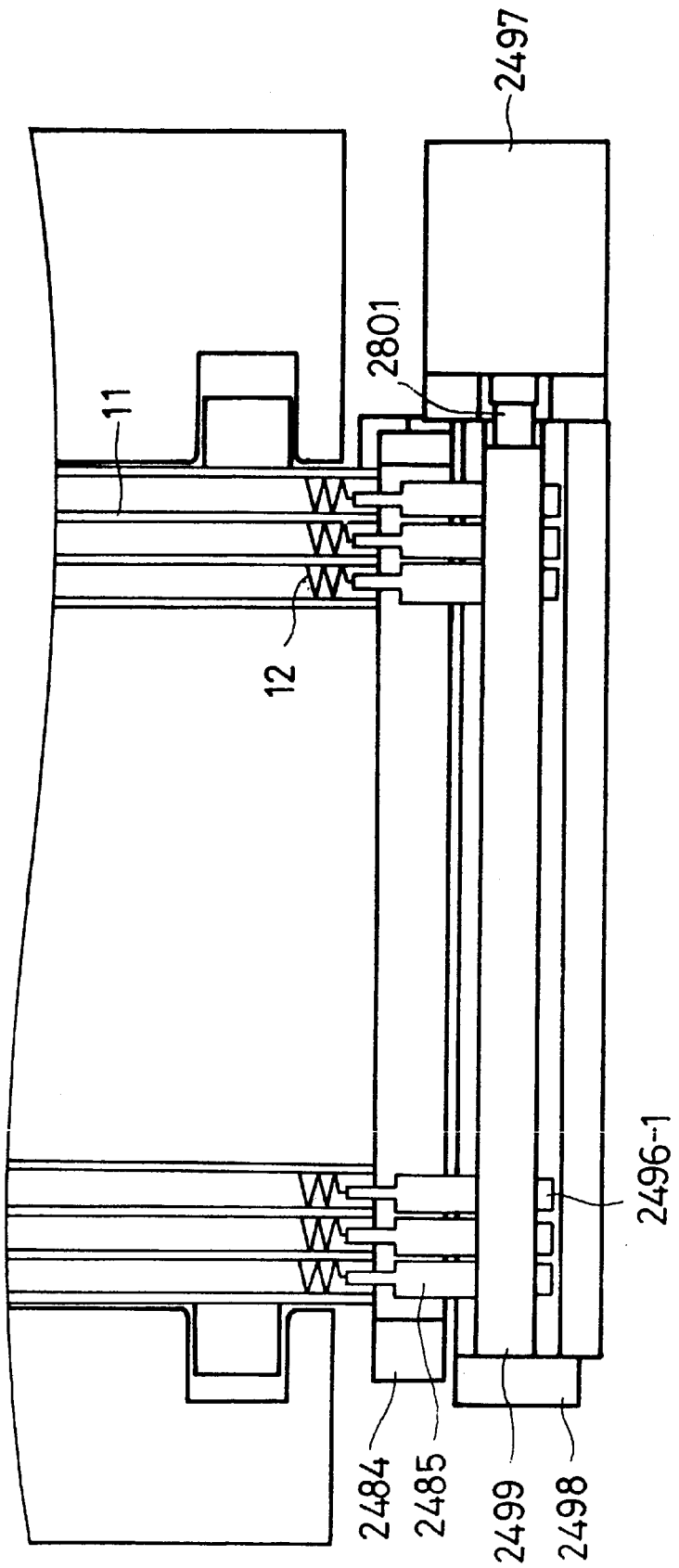
FIG. 27 is a plan view showing a part of the picket device and a part of a heat exchanger.

FIG. 27 is a plan view of the picket device, in which a part of the assembly of the tubes 11 and the fin 12 interposed therebetween of the heat exchanger arranged on the table 2234 shown in FIG. 24, and one of a pair of the picket devices arranged at both sides of the table 2234 are shown. Also, FIG. 28 is a front side view of the picket device of FIG. 27.

Referring to the drawings, the tube guide 2484contact each end portion of the tubes 11 to align the tubes 11. A plurality of pickets 2485 are inserted through the holes (not shown) formed in the tube guide 2484 and the end portion thereof can pushes the end portions of the fins 12 inserted between the tubes 11. That is, the pickets 2485 push the fins 12 which are protruded beyond the end portion of the tubes 11. The pickets 2485 are fixed to a plurality of holders 2496 (see FIG. 28) by screws 2496-1. The holders 2496 are provided to correspond to the pickets 2485 one by one. That is, the holders 2496 are provided as the respective parts and coupled to each other through coupling grooves 2496b and coupling protrusions 2496a. The structure of the holders 2496 can be seen by the plan view of FIG. 27 and the front side view of the holder portion shown in FIG. 28. Each holder has a coupling groove 2496b and a coupling protrusion 2496b. Thus, the holders 2496 are engaged with each other with a predetermined play. The holder 2496 disposed at the most right side is connected through a rod of a cylinder 2497 and a joint 2801. The holders 2496 can be transferred at a predetermined interval by the compression and expansion operations of the cylinder 2497. Consequently, the pickets 2485 can accurately inserted in the fin insertion spaces formed between the tubes 11.

Figure 28:
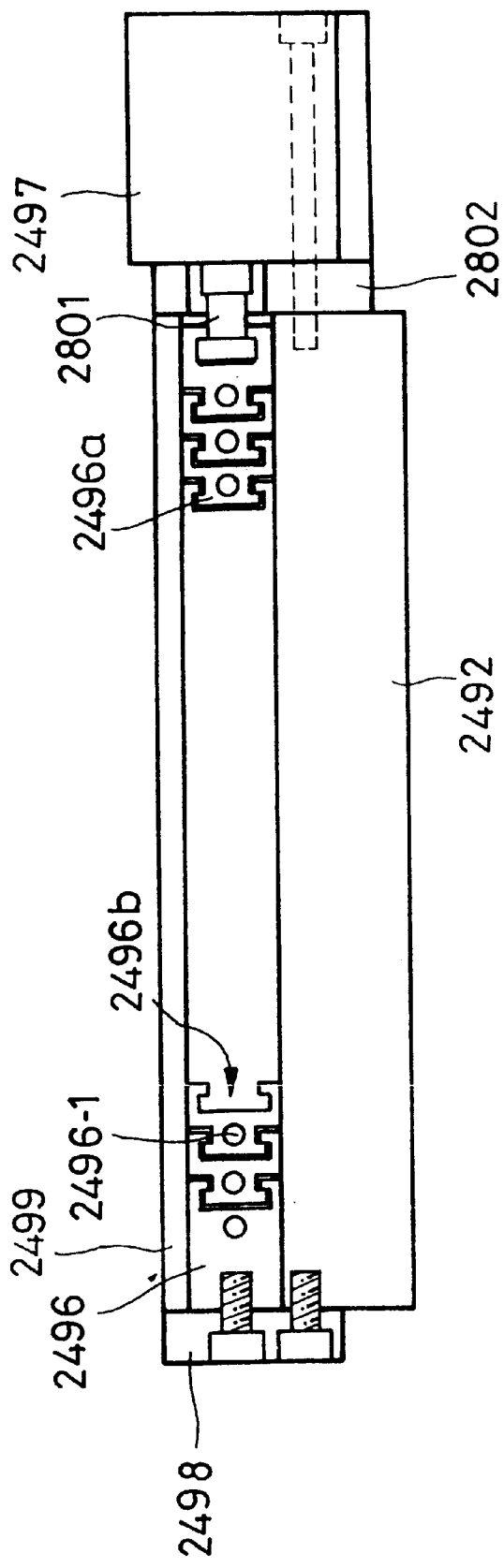
FIG. 28 is a front side view showing a holder portion of the picket device shown in FIG. 27.

It can be seen that the holder 2496 is covered by a side cover 2498 in FIG. 27 and by a horizontal cover 2499 in FIG. 28. The holder 2496 can move by the operation of the cylinder 2497 in space covered by the side and horizontal covers 2498 and 2499. It should be noted that these covers 2498 and 2499 are fixed to the picket plate 2492 in FIG. 28. The cylinder 2486 is installed in the picket plate 2492 as described in FIG. 24 and the end portion of the rod of the cylinder 2486 is connected to the lift plate 2483. Thus, when the rod of the cylinder 2486 is compressed, the picket plate 2492 is moved in a direction toward the lift plate 2483. Accordingly, the picket 2485 protrudes through the hole formed in the tube guide 2484. As the picket 2485 protrudes, the step of pushing the fins 12 between the tubes 11 is completed.

Figure 29:
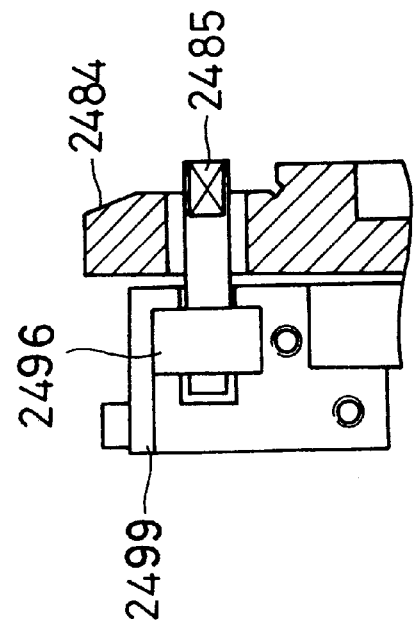
FIG. 29 is a side view showing a part of the picket device and a part of the heat exchanger of FIG. 27.

FIG. 29 shows the tube guide portion and the picket portion only in FIG. 24 by magnifying the same. From the drawing, it can be seen that the picket 2485 protrudes through the hole formed in the tube guide 2484, that the picket 2485 is fixed to the picket holder 2496, and that the picket holder 2496 is covered by the cover 2499.

Figure 30:
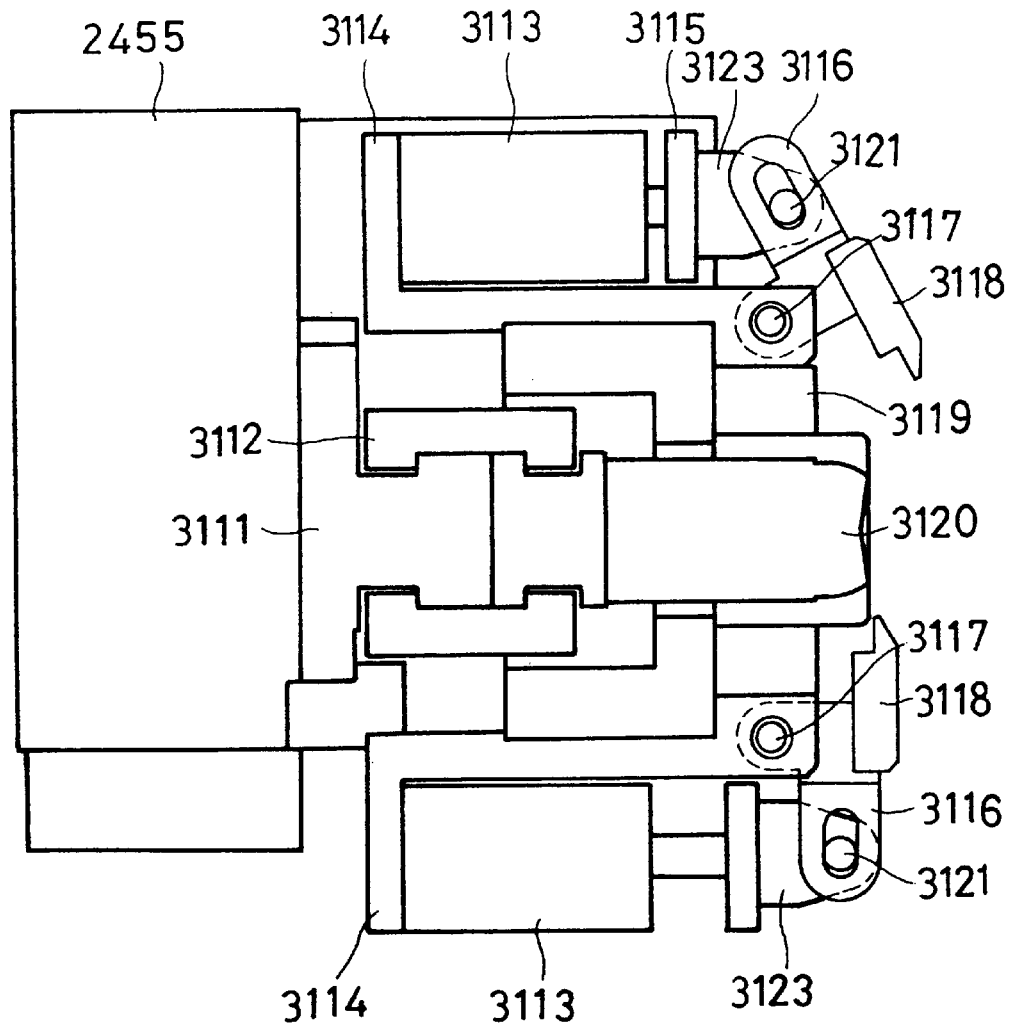
FIG. 30 is a front side view showing the header assembling apparatus.
Figure 31:
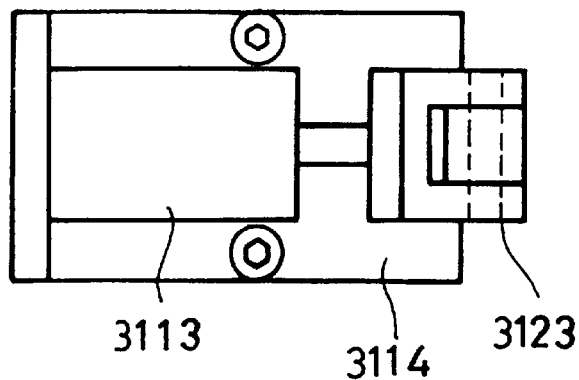
FIG. 31 is a plan view of the header assembling apparatus.
Figure 32:
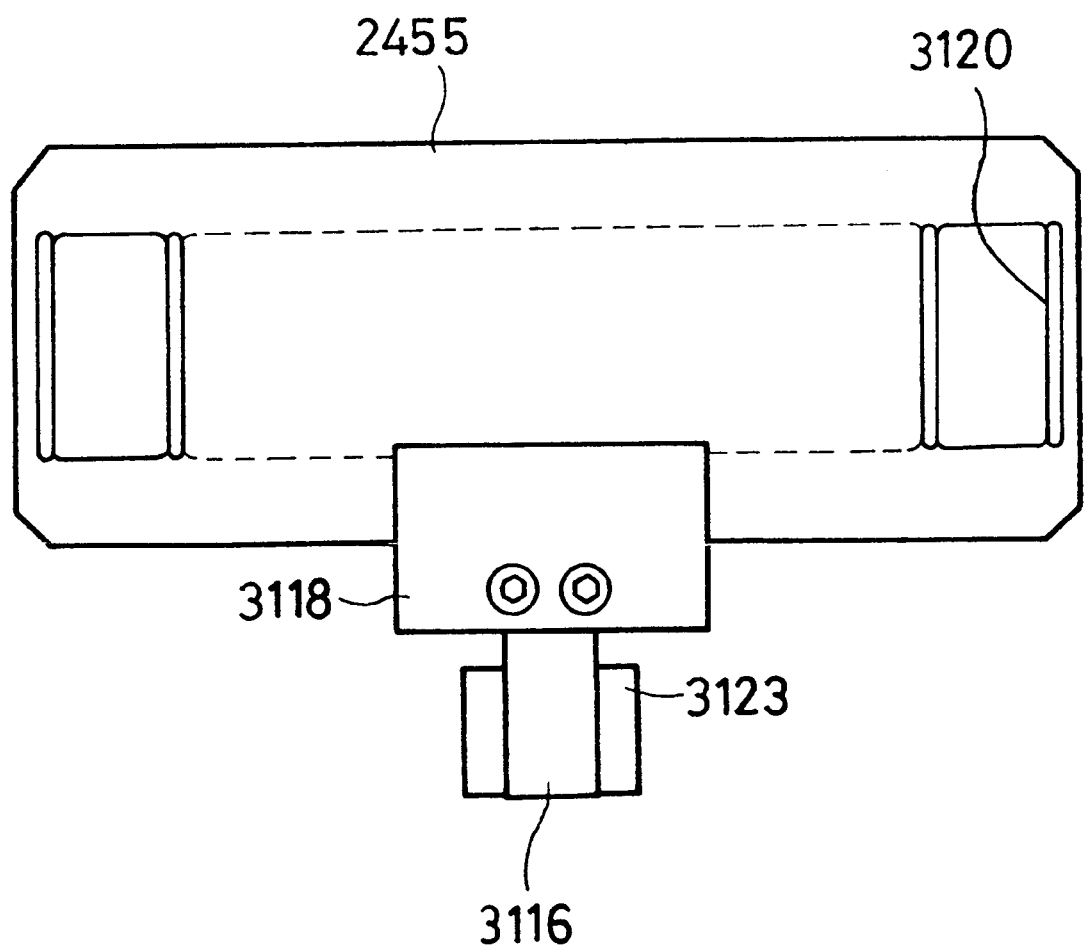
FIG. 32 is a right side view showing a part of the header assembling apparatus.

FIG. 30 is a front side view of the header assembler; FIG. 31 is a plan view of the header assembler of FIG. 30; and FIG. 32 is a right side view showing a part of the header assembler of FIG. 30. The header assembler shown in FIG. 30 is installed at the tool main body 2455 of the header assembling apparatus shown in FIG. 24. The tool main body 2455 is located at both sides of the table 2234 as already described In FIG. 24.

Referring to FIG. 30, a tool 3120 is fixed to the front surface of the tool main body 2455 through a tool housing 2111 and a fixed portion 3112. The toot 3120 is inserts in each end portion of the tubes 11 (see FIG. 1) and extends each end portion of the tubes 11. That is, when each end portion of the tubes 11 is assembled to the tube insertion hole formed in the header 14 of FIG. 1, as the tool 3120 is inserted in each end portion of the tubes 11, each end portion of the tubes 11 is extended due to the shape of the tool 3120. Thus, the tubes 11 can be fixed to the header 14. The number of tools 3120 corresponding to the number of the tubes 11 is installed at the front surface of the housing 3111 as shown in FIG. 32.

A cylinder mount 3114 is installed at the upper and lower sides of the tool housing 3111 at the front surface of the tool main body 2455. A cylinder 3113 is installed at the cylinder mount 3114. A joint 3123 of a cylinder rod 3115 is connected to a lever 3116 via a pin 3121. That is, a slot is formed in the lever 3116, the pin 3121 is fixed to the joint 3123 of the cylinder rod 3115, and the pin 3121 is inserted in the slot of the lever 3116. One side of the lever 3116 is rotatably coupled to one side of the cylinder mount 3114 by another pin 3114. A header gripper 3118 is installed at one end portion of the lever 3116.

The header 14 can be maintained on the header mount 3119 by the header gripper 3118. Of two cylinders 3113 shown in FIG. 30, the upper one is in a state in which the rod 3115 of the cylinder 3113 is compressed. Here, the header gripper 3118 maintains a state of being separated from the header mount 3119, as shown in the drawing. Contrary to the above, the lower one is in a state in which the rod 3115 of the cylinder 3113 expands. Here, the header gripper 3118 maintains a state of being close to the header mount 3119, as shown in the drawing.

In FIG. 32, only one of the upper and lower header grippers is shown. The header gripper 3118 is installed at the middle portion of the tool main body 2455 and has a predetermined width to maintain the header 14 installed at the header mount (14 of FIG. 31).

When robots or transfer devices which are not shown take the header 14 to the header mount 3119, the header gripper 3118 maintains a state of being separated from the header mount 3119 and is ready to be capable of gripping the header 14. When the header 14 approaches the header mount 3119, the header gripper 3118 pivots toward the header mount 3119 so that the header 14 can maintain a state of being firmly held by the header gripper 3118.

The header 14 is assembled with the tubes 11 as the slide 2454 advances, as shown in FIG. 24. When the slide 2454 advances, the header 14 maintained by the header gripper 3118 installed at the tool main body 2455 is fitted in each end portion of the tubes 11. Here, the tool 3120 can be inserted in the inside of each of the tubes 11 by a force applied by the slide 2454 and each end portion of the tubes 11 is slightly deformed due to the shape of the tool 3120. That is, the tube insertion hole formed in the header 14 corresponds to each sectional area of the tubes 11 and, by deforming and extending each sectional area of the tubes 11, the header 14 is prevented from escaping from the tubes 11. When the header assembly step is completed, the cylinder 3113 is compressed. Accordingly, the header firmly held by the gripper 3118 is released and then the slide 2454 escapes from the table 2234.

In the operation of the header assembling apparatus of a heat exchanger according to the present invention, the assembly of parts of the heat exchanger, in which the fin 12 are inserted between the tubes 11, the supports 13 arranged at both sides thereof, and a part of pins 12 protrude beyond the end portion of the tubes 11, is transferred to the header assembling apparatus shown in the drawings. The heat exchanger assembly is arranged on the table 2234 shown in FIG. 22 by the above-described transfer device.

Next, a picket step for pushing the fins 12 protruding between the tubes 11 is performed. This step is performed by the picket device installed at the side surface of the table 2234 to be capable of moving. The picket device is shown in FIGS. 24, 27, 28 and 29.

In FIG. 24, the rotational force of the servo motor 2466 is transferred to the nut 2478 via the ball screw 2475 and accordingly the slide bracket 2473 is transferred to a predetermined position. The cylinder mount 2481 is installed at the slide bracket 2473 and the cylinder installed at the cylinder mount 2481 elevates the lift plate 2483. As the lift plate 2483 ascends, the picket 2485 installed at the end portion of the lift plate 2483 is in a state of performing the picket work. Here, once the operation of the servo motor 2466 is finished, the servo motor 2466 is fixed and does not work until another assembling work starts.

The picket work is performed by the cylinder 2486 and the cylinder 2497. When the cylinder 2497 (FIG. 27) is compressed or expands, the holders 2496, to which the pickets 2485 are fixed, move in a direction in which the cylinder 2497 is compressed so that the pickets 2485 are aligned at the positions so as to be inserted between the tubes 11. Next, when the cylinder is compressed, the picket plate 2492 moves close to the lift plate 2483 so that the pickets 2485 are inserted between the tubes 11 to push the fins 12.

When the heat exchanger assembly is placed on the table 2234, the cylinder 2240 and the cylinder 2228 maintain a compressed state. When the cylinder 2240 is compressed, the slide 2237 and the taper plate 2236 fixed thereto descend and the first gripper 2233 is biased to the left on the drawing. The biasing force is provided by the spring 2244. Likewise, when the cylinder is compressed, the links 2226 and 2224 form a V-shape and accordingly the force by the pusher 2232 pushing the gripper 2235 is released. The elastic force of the spring 2244 biases the gripper 2235 to the right on the drawing.

In the above state, when the heat exchanger assembly is placed on the table 2234, the cylinder 2240 and the cylinder 2228 expand. Accordingly, the grippers 2233 and 2235 firmly hold the heat exchanger assembly. The grippers 2233 and 2235 maintain a fixed state by pressing the support portion of the heat exchanger assembly. The fixed state continues until the assembly of the header is completed.

Next, the header assembly step is performed. In the header assembly step, the robot or transfer device (not shown) maintains the header 14 at the header mount 3119 installed at the tool main body 2455 (FIG. 30). When the header 14 is to be maintained at the header mount 3119, the cylinder 3113 maintains a state of being expanded. Accordingly, the header gripper 3118 is separated from the header mount 3119. After the header 14 is to be maintained at the header mount 3119, the header gripper 3118 presses a part of the header 14 and a state of being firmly held by the header gripper 3118 is maintained.

The header 14 is assembled with the tubes 11 as the servo motor 2487 rotates. The rotational force of the servo motor 2487 rotates the pulley 2465 via the rotary shaft 2472 and the ball screw 2469 via the belt 2463. The nut 2470 coupled to the ball screw 2469 can reciprocate by the rotation of the ball screw 2469 in the lengthwise direction of the ball screw 2469. The slide 2454 reciprocates as the but 2470 reciprocates.

As the slide 2454 approaches the table 2234, the header 14 maintained at the header mount 3119 of the tool main body 2455 can be assembled with the tubes 11. Concurrently, the tubes 11 are deformed by the tool 3120 and then a state in which the header 14 and the tubes 11 are coupled is maintained. When the assembly work is completed, the cylinder 3113 is compressed and the header 14 is released from being firmly held by the header gripper 3118. Then, as the servo motor 2487 rotates, the slide 2454 is transferred in a direction in which it is separated from the table 2234.

When the header assembly work is completed, the heat exchanger assembly fixed by the first and second pressing blocks 2233 and 2235 shown in FIG. 22 is released and transferred to the subsequent step by the robot or transfer device which is not shown. The subsequent step is a grease removing step in which foreign materials and oil adhering to the heat exchanger assembly during transfer by the conveyer belt are removed.

As described above, the heat exchanger assembling apparatus according to the present invention has an advantage in that the assembly work of a heat exchanger manually or semiautomatically performed in the conventional technology is fully automated so that a rapid and accurate assembly is possible. Thus, the working persons and cost can be reduced while productivity can be improved.

It is noted that the present invention is not limited to the preferred embodiment described above, and it is apparent that variations and modifications by those skilled in the art can be effected within the spirit and scope of the present invention defined in the appended claims.

What is claimed is:

1. A heat exchanger assembling apparatus comprising:
   a tube loading device for loading tubes of a heat exchanger, in an aligned state, into a tray having a plurality of partitions spaced at intervals;
   a fin supply device for supplying fins to spaces between the partitions of the tray;
   a support supply device for supplying supports to the spaces between the partitions at an outermost side of the tray;
   a vision inspector for inspecting whether the fins, the tubes, and the supports are appropriately arranged in the tray without any spaces indicating missing parts;
   a discharging device for discharging the fins, the tubes, and the supports from the tray to a table and aligning the fins, the tubes, and the supports with respect to a width direction and a length direction of the table;
   a transfer device for gripping the fins, the tubes, and the supports and transferring the fins, the tubes, and the supports to a header assembly table; and
   a header assembling device comprising:
      a pressing device for pressing and firmly holding a support on the header assembly table;
      a picket device for pushing the fins into spaces between the tubes;
      a header assembly device for coupling a header to the tubes by deforming an end portion of the tubes after fitting the header to the tubes, thereby assembling the header to the tubes on the header assembly table; and
      a transfer device for transferring the header assembling device relative to the header assembly table.

2. The apparatus as claimed in claim 1, wherein the spaces between the partitions of the tray include first relatively narrow partition spaces for insertion of the tubes and second relatively wide partitions spaces for insertion of the fins, and the apparatus includes a rack gear located on a bottom surface of the tray.

3. The apparatus as claimed in claim 1, wherein the tube loading device comprises:
   a first driving motor;
   a pair of sprockets rotated by the first driving motor and inclined with respect to each other;
   a chain circulated by the sprockets; and
   a tube receiving portion installed with respect to the chain and having a space for accommodating the tubes.

4. The apparatus as claimed in claim 3, wherein the tube loading device further comprises:
   loading guides for loading the tubes into a space between the loading guides;
   a knife for preventing the tubes from falling under the loading guides;
   a cylinder for selectively retracting and extending the knife;
   a first block to which the cylinder is fixed and including a ball screw groove;
   a first ball screw aligned in a vertical direction and inserted in the ball screw groove of the first block;
   a first bevel gear located at an upper end of the first ball screw;
   a first shaft aligned in a horizontal direction;
   a second bevel gear engaging the first bevel gear; and
   a second driving motor for rotating the first shaft.

5. The apparatus as claimed in claim 4, wherein the tube loading device further comprises:
   a rotation portion having a blade for pushing tubes, one by one;
   a second shaft aligned in a horizontal direction and to which the rotation portion is fixed;
   a third driving motor for rotating the second shaft;
   a first gear located at an end of the second shaft;
   a second gear engaging the first gear;
   a third shaft parallel to the second shaft and located at the second gear;
   a third bevel gear located at the third shaft;
   a second block in which the rotation portion is rotatably installed;
   guides located at a bottom surface of the second block;
   a fourth shaft rotatably installed in and penetrating the second block;
   a fourth bevel gear engaging the third bevel gear and located at an upper end portion of the second block;
   a third gear installed at a lower end portion of the second block;
   an insertion portion guided by the guides located at the bottom surface of the second block, and including an insertion space in which the tubes are inserted during assembly of a heat exchanger; and
   a rack gear located in one side of the second block and engaging the third gear.

6. The apparatus as claimed in claim 4, wherein the tube loading device further comprises:
   a fourth driving motor;
   a second ball screw aligned in a horizontal direction and rotated by the fourth driving motor;
   a bearing rotating with respect to the second ball screw;
   a nut coupled to the second ball screw;
   guide shafts parallel to the second ball screw; and
   a bushing fixed to the nut and coupled to the second ball screw, wherein, by connecting one of the bearing and the nut to one of the first bevel gear, the third bevel gear, and the rotation portion, separation between one of the loading guides and the insertion portion can be selectively changed.

7. The apparatus as claimed in claim 3, further comprising:
   a second driving motor;
   a first pulley rotated by the second driving motor;
   an endless belt;

a second pulley connected to the first pulley via the endless belt; and a rotary brush rotated by the second pulley, to prevent the tubes from overlapping in the tube receiving portion.

8. The apparatus as claimed in claim 2, wherein fin supply device comprises:

first and second gears mounted on first and second rotary shafts and engaging the rack gear on the bottom surface of the tray so that the tray can be transferred in a first direction;

first and second pulleys installed on the first and second rotary shafts of the first and second gears, respectively;

a belt and driving motor for rotating the first and second gears through the first and second pulleys; and a chute for supplying fins, aligned with the second rotary shaft of the second gear so that the fins are supplied between the partitions of the tray.

9. The apparatus as claimed in claim 8, wherein the fin supply device further comprises:

an elevating lift having vertical bars for supporting the bottom surface of the tray;

a first cylinder for elevating the elevating lift;

a pair of bars including rollers, facing each other for supporting the bottom surface of the tray; and second and third cylinders for changing separation of the bars including the rollers, wherein the first gear of the fin supply device is engaged with the rack gear at the bottom surface of the tray for lowering, by the elevating lift, of the tray when supported by the rollers.

10. The apparatus as claimed in claim 1, wherein the support supply device comprises:

a pickup device for gripping the supports and transferring the supports to a predetermined position;

the turn shaft device for vertically erecting the supports transferred to a predetermined position by the pickup device; and a robot gripping the supports vertically erected and arranging the gripped supports at a predetermined position of the tray.

11. The apparatus as claimed in claim 10, wherein the pickup device comprises:

a finger for gripping the supports;

a first cylinder for elevating the finger; and a second cylinder for guiding the finger to move in a horizontal direction.

12. The apparatus as claimed in claim 10, wherein the turn shaft device comprises:

a table on which the support s are placed;

a pusher for moving the supports placed on the table;

a turn shaft having a groove for inserting the supports; and a turn cylinder for rotating the turn shaft.

13. The apparatus as claimed in claim 1, wherein the vision inspector comprises:

a roller for supporting and transferring the tray;

a stopper device for stopping the tray for a predetermined time;

a camera installed above the tray when the tray is supported on the roller, for taking a photograph of the tray; and a monitor for displaying an image photographed by the camera.

14. The apparatus as claimed in claim 13, wherein the tray is returned when a space indicating a missing part is detected in the image photographed by the camera of the inspector.

15. The apparatus as claimed in claim 1, wherein the discharging device comprises:

a frame including guide rails;

a plate horizontally moving along the guide rails of the frame;

a first nut mounted on a rear surface of the plate;

a first ball screw coupled to the first nut;

a first driving motor for rotating the first ball screw;

a cylinder mount fixed to the plate;

a first cylinder having an extendable rod and installed on the cylinder mount;

an elevating plate fixed to an end of the rod of the first cylinder;

guides installed at the rear surface of the plate;

a block guided along the guides;

a first pusher fixed to the block;

a second nut fixed to the block;

a second ball screw coupled to the second nut; and a second driving motor fixed to th e plate to rotate the second ball screw.

16. The apparatus as claimed in claim 15, wherein the discharging device comprises:

a second cylinder having an extendable rod;

a slide fixed to an end of the rod of the second cylinder to be guided and transferred; and a second pusher fixed to the slide and pushing the supports at an outermost side, so that the fins, the tubes, and the supports discharged from the tray are moved in the widthwise direction and aligned.

17. The apparatus as claimed in claim 1, wherein the transfer device comprises:

a frame;

a first cylinder installed on the frame;

a transfer portion horizontally reciprocated by operation of the first cylinder;

a plate fixed to the transfer portion;

a slide transferred in a direction perpendicular to reciprocation of the transfer portion by the first cylinder;

a second cylinder fixed to the plate to reciprocate the slide;

a third cylinder installed on the slide; and a jaw device elevated by the third cylinder, for gripping and transferring the fins, the tubes, and the supports in an aligned state.

18. The apparatus as claimed in claim 17, wherein the jaw device comprises:

a cylinder mount for elevation by the third cylinder;

a pair of cross bars installed under the cylinder mount;

fourth and fifth cylinders fixed to the pair of cross bars a pair of plates moved toward and away from each other by the fourth and fifth cylinders;

slides sliding with respect to each of the plates;

sixth and seventh cylinders having end portions fixed to each of the slides so that the slides are movable toward and away from each other; and jaws fixed to each of the slides.

19. The apparatus as claimed in claim 1, wherein the pressing device comprises:

first and second pressing blocks facing each other and moving toward the center of the header assembly table and having an elastic bias toward outer sides of the table;

a taper plate contacting one end of the first pressing block and separating from the end of the first pressing block, wherein a part of a contact surface is tapered;

a slide having a side to which the taper plate is fixed;

a first cylinder for elevating the slide;

a lever having a pusher contacting one end of the second pressing block and rotating;

a first link rotatably connected to one end of the lever;

a second link having a connection to the first link at one end, and having another end that is rotatable; and a second cylinder for elevating the connection between the first link and the second link.

20. The apparatus as claimed in claim 1, wherein the picket device comprises:

a tube guide which can approach an end of each of the tubes arranged on the header assembly table;

a plurality of pickets for moving the fins between the tubes by being inserted into the tube guide;

a picket holder including a coupling groove and a coupling protrusion and located at ends of the pickets to fix the pickets in position and connected to each other through the coupling groove and the coupling protrusion;

a first lift plate;

a first cylinder connected to the picket holder at an outermost side of each of the picket holders;

a picket plate extending from a lower portion of the tube guide;

a second cylinder located between a lower portion of the picket plate and the lift plate for moving the picket plate and the lift plate toward and away from each other; and a third cylinder for elevating the lift plate.

21. The apparatus as claimed in claim 1, wherein the header assembling device further comprises:

a tool body having a front surface and including a plurality of tools so that an end of a tube can be deformed when the end of the tube is inserted into a tube insertion hole in the header;

a cylinder mount on which first and second cylinders are installed at upper and lower sides of the tool body, the first and second cylinders having respectively extendable rods;

a rotatable lever having a slot connected to an end of the rods of the first and second cylinders; and a gripper fixed to one side of the lever for gripping the header.

* * * * *